United States Patent [19]

Matsumoto et al.

[11] 4,150,788
[45] Apr. 24, 1979

[54] REMOTE-CONTROLLED CENTRAL AIR-CONDITIONING SYSTEM

[75] Inventors: Yoshihisa Matsumoto; Hiroaki Yonekubo; Shoji Hatsutori, all of Osaka, Japan

[73] Assignee: Matsushita Electric Industrial Co., Ltd., Japan

[21] Appl. No.: 814,027

[22] Filed: Jul. 8, 1977

[30] Foreign Application Priority Data

| Jul. 8, 1976 [JP] | Japan | 51-81655 |
| Jan. 13, 1977 [JP] | Japan | 52-3377 |
| Jan. 19, 1977 [JP] | Japan | 52-5320 |
| Jan. 28, 1977 [JP] | Japan | 52-8977 |
| Feb. 15, 1977 [JP] | Japan | 52-15665 |

[51] Int. Cl.$^2$ .................................. F24D 3/00
[52] U.S. Cl. .................................. 237/8 R; 165/22
[58] Field of Search ............... 236/9 A; 237/8 R, 63; 62/182; 165/22

[56] References Cited

U.S. PATENT DOCUMENTS

| 2,153,382 | 4/1939 | Martin, Jr. ............... 237/8 R X |
| 3,202,208 | 8/1965 | Geiringer ..................... 165/22 |

Primary Examiner—William E. Wayner
Attorney, Agent, or Firm—Lowe, King, Price & Becker

[57] ABSTRACT

A remote-controlled forced-circulation central air-conditioning system comprising a central heat-exchanger unit and a plurality of terminal air-conditioning units which are connected to the central heat-exchanger unit through terminal valves, respectively, which are arranged in parallel with one another, wherein a water circulation pump and the central heat-exchanger unit are started and shut off upon detection of variation in the pressure and/or the temperature of the liquid such as hot water in the liquid supply circuit leading to the terminal air-conditioning units when the terminal valve or valves are opened up and thereafter closed. The system may include a terminal heat-exchanger unit such as a bath.

23 Claims, 18 Drawing Figures

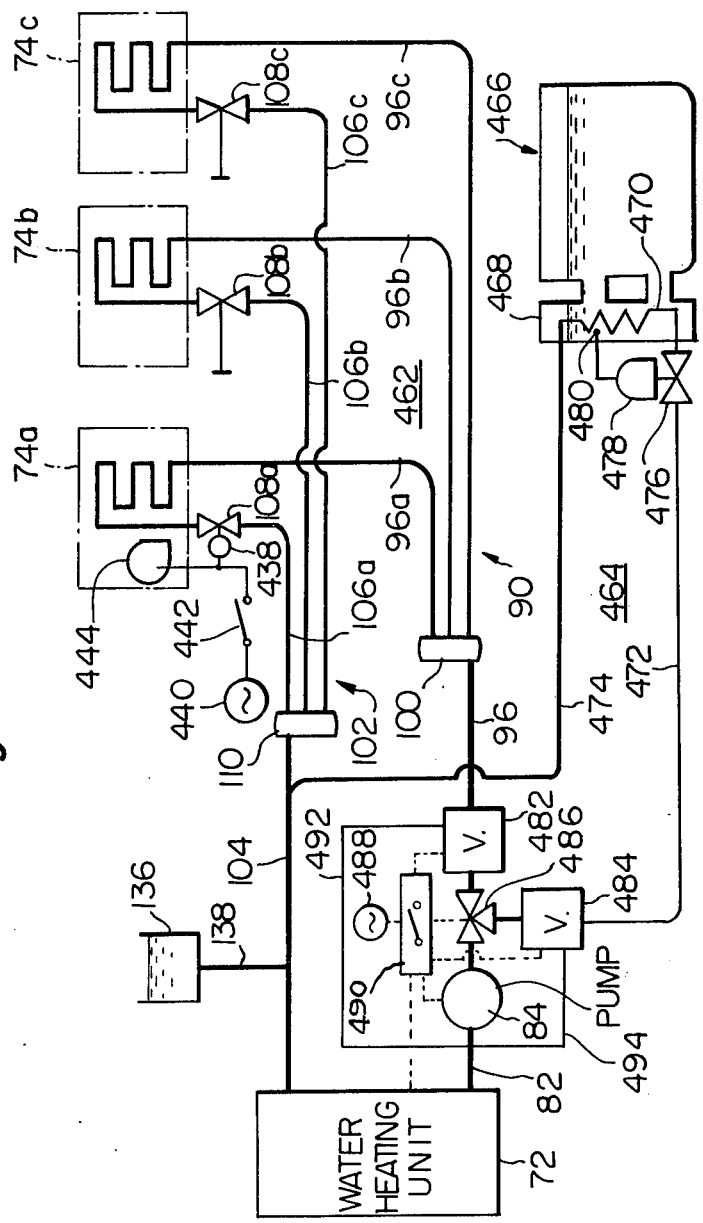

REMOTE-CONTROLLED CENTRAL AIR-CONDITIONING SYSTEM

The present invention relates to central air-conditioning systems and particularly to a remote-controlled, forced-circulation hot-water or chilled-liquid heating or cooling system including a central heat-exchanger unit and a plurality of terminal air-conditioning units located in individual zones to be air-conditioned.

In a conventional remote-controlled forced-circulation hot-water or chilled-liquid heating or cooling system, the hot water or chilled liquid generated in the central heat-exchanger unit such as a hot-water boiler or a water refrigerator is supplied by a motor-driven water circulation pump to the terminal air-conditioning units through a supply circuit including a main supply passageway leading from the water circulation pump and branch supply passageways leading from the main supply passageway and respectively terminating in the individual terminal air-conditioning units when the terminal air-conditioning units are switched in. The terminal air-conditioning units are thus respectively provided with electric switches which are connected in parallel across a suitable power source through a coil forming part of a normally-open relay switch which is connected between the power source and each of the electrically-operated actuators of the central heat-exchanger unit and the motor-driven water circulation pump. When the switch for one of the terminal air-conditioning units is closed, the coil connected between the switch and the power source is energized and causes the relay switch to close so that the central heat-exchanger unit and the water circulation pump are put into operation delivering hot water to the supply circuit of the system and through the supply circuit to the terminal air-conditioning unit with which the switch closed is associated.

The supply circuit of the system being in direct communication with all of the terminal air-conditioning units, the hot water delivered from the water circulation pump is passed not only to the terminal air-conditioning unit having the associated switch closed but to the remaining terminal air-conditioning units having the respectively associated switches left open. Thus, all of the terminal air-conditioning units are rendered operative and as a consequence a zone or zones which need not be or are not desired to be heated or cooled must be heated or cooled when only one or some of the switches for the terminal air-conditioning units are closed. This not only results in wastes of energy consumed by the central heat-exchanger unit but would discomfort an occupant, if any, of the zone or zones being heated unnecessarily or contrary to the occupant's will.

The switches associated with the terminal air-conditioning units and the relay switch connected to the respective actuators of the central heat-exchanger unit and the motor-driven water circulation pump form part of a control circuit which must be subjected both to the driving current to be supplied to the actuators of the central heat-exchanger unit and the motor-driven water circulation pump and to the low control current to be passed through the switches associated with the terminal air-conditioning units. The control circuit to be incorporated in a conventional remote-controlled central air-conditioning system of the described character must therefore be provided with a stepdown transformer, which adds to the installation and maintenance costs of the system. Furthermore, laborious and time-consuming works are required for the installation of such a transformer and for the wiring of for the control circuit, especially for the terminal switches to be located in the individual zones in which the terminal air-conditioning units are provided.

It is, accordingly, an important object of the present invention to provide an improved hot-water or chilled-liquid central air-conditioning system which can be remote-controlled without use of a central control circuit which is costly for installation and servicing and which would require cumbersome works for wiring in a number of zones to be air-conditioned.

It is another important object of the present invention to provide an improved remote-controlled hot-water or chilled-liquid central air-conditioning system in which only the terminal air-consitioning unit or units which are desired to operate are supplied with hot water or chilled liquid from the central heat-exchanger unit.

In accordance with the present invention, these and other objects will be accomplished in a central air-conditioning system which basically comprises a central heat-exchanger unit operative to produce liquid heat-exchange medium therein; a plurality of terminal air conditioning units each adapted to pass the liquid heat-exchange medium therethrough; forced-flow inducing means having a liquid inlet end in communication with the central heat-exchanger unit and operative to deliver from the liquid outlet end the liquid heat-exchange medium under pressure; circuit means including a liquid supply circuit comprising a main supply passageway communicable with the liquid outlet end of the forced-flow inducing means and branch supply passageways leading from the main passageway and respectively terminating in the terminal air-conditioning units and a return circuit communicable with the terminal air-conditioning units and terminating in the central heat-exchanger unit; terminal valves provided between the central heat-exchanger unit and the terminal air-conditioning units, respectively, and each having open and closed conditions, and control means provided between the liquid outlet end of the forced-flow inducing means and the main supply passageway and responsive to operational conditions of the circuit means having a first condition in which at least one of the terminal valves is open, a second condition in which one of the terminal valves is being closed with the remaining terminal valves fully closed, and a third condition in which all of the terminal valves are fully closed, the control means being operative to render the central heat-exchanger unit and the forced-flow inducing means operative in response to the first condition of the circuit means and inoperative in response to each of the second and third conditions of the circuit means and to disconnect the circuit means from the forced-flow inducing means in response to the third condition of the circuit means for forming a pressure trapping circuit which is closed at one end by the control means and at the other ends by the terminal valves.

The above mentioned control means may comprise differential-pressure responsive means responsive to variation in the differential liquid pressure developed upstream and downstream of the control means, the control means being operative to render the forced-flow inducing means operative when the differential liquid pressure responded to by the differential-pressure responsive means is lower than a predetermined limit. As an alternative, the control means incorporated in the central air-conditioning system according to the present invention may comprise a check valve having a liquid inlet end communicating with the liquid outlet end of the forced-flow inducing means and a liquid outlet end communicating with the aforesaid liquid supply circuit, differential-pressure responsive means responsive to variation in the differential liquid pressure developed between locations upstream of the forced-flow inducing means and downstream of the check valve, and temperature-sensitive means sensitive to variation in the temperature of the liquid heat-exchange medium in the liquid supply circuit downstream of the check valve. In this instance, the control means is operative to render the forced-flow inducing means operative when the differential liquid pressure responded to by the differential-pressure responsive means is lower than a predetermined limit and inoperative when the temperature responded to by the temperature-sensitive means is lower than a predetermined level.

The central air-conditioning system according to the present invention may further comprise at least one terminal heat-exchanger unit such as a bath. In this instance, the circuit means of the system comprise a first liquid supply circuit as the aforesaid liquid supply circuit and a second liquid supply circuit terminating in the terminal heat-exchanger unit and a terminal valve provided in the second liquid supply circuit and having open and closed conditions. The control means in such a system comprises first and second valve means each similar to the above described differential-pressure responsive means and a shift valve to selectively provide between the forced-flow inducing means and either of the first and second valve means.

The features and advantages of a central air-conditioning system according to the present invention will be more clearly understood from the following description in which like reference numerals and characters designated corresponding or similar units, members, elements or spaces and in which:

FIG. 17 is a view similar to FIG. 15 but shows a seventh preferred embodiment of the central air-conditioning system according to the present invention.

Figure 1:
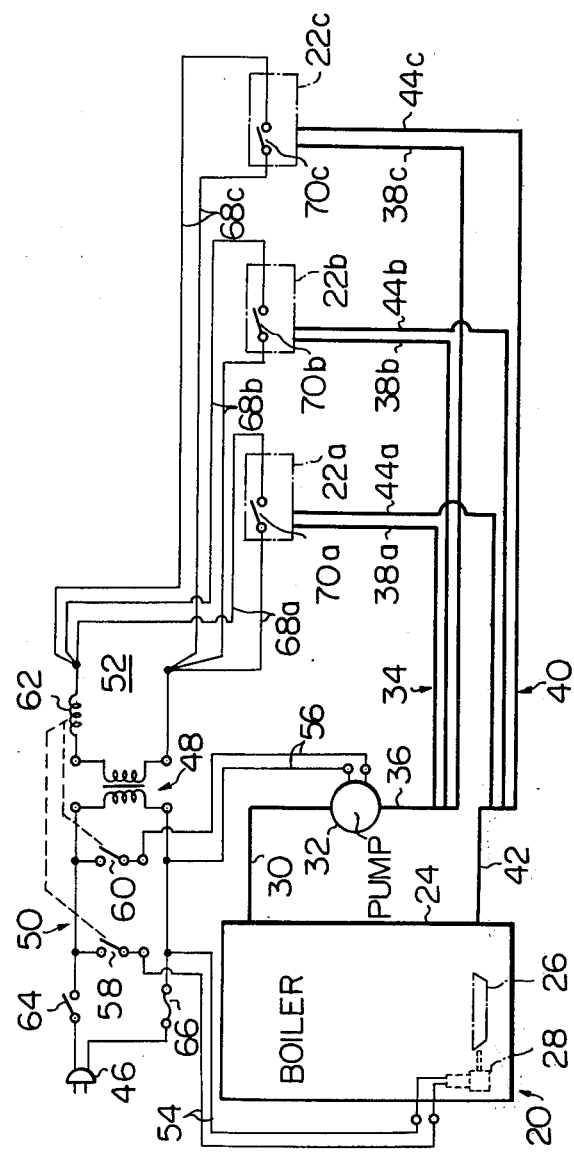
FIG. 1 is a schematic view showing a representative example of a prior-art remote-controlled, forced circulation central air-conditioning or space heating system.

Referring to the drawings, particularly to FIG. 1 thereof, a known remote-controlled, multi-zone forced-circulation hot-water heating system is shown as a representative example of prior-art remote-controlled central air-conditioning systems of the particular character to which the present invention generally appertains. The hot-water heating system largely comprises a water heating unit 20 and a plurality of terminal heating units 22a, 22b and 22c each of which is constituted by a radiator or convector having a hot-water inlet and a return-water outlet. The water heating unit 20 comprises a hot-water boiler 24 having a fuel burner 26 provided with an electrically-operated burner actuator 28 which is adapted to start and shut off the fuel burner 26 when electrically energized and deenergized, respectively. The boiler 24 is of the water recirculation type having a hot-water outlet and a return-water inlet. The hot-water outlet of the boiler 24 communicates through a hot-water delivery pipe 30 with the suction port of a motor-driven water circulation pump 32. The delivery port of the water circulation pump 32 in turn is in communication with the terminal heating units 22a, 22b and 22c through a hot-water supply circuit 34 which consists of a hot-water supply main line 36 leading from the delivery port of the pump 32 and hot-water supply branch lines 38a, 38b and 38c branched from the main line 36 and leading to the respective hot-water inlets of the individual terminal heating units 22a, 22b and 22c. The respective water outlets of the terminal heating units 22a, 22b and 22c are in communication with the return-water inlet of the boiler 24 through a water return circuit 40 which consists of a water return main line 42 leading from the return-water inlet of the boiler 24 and water return branch lines 44a, 44b and 44c leading from the respective water outlets of the terminal heating units 22a, 22b and 22c and jointly terminate in the water return main line 42.

The burner actuator 28 of the water heating unit 20 and the motor-driven water circulation pump 32 are electrically connected to an attachment plug 46 across an electric control circuit which consists of a step-down transformer 48, a high-voltage power supply network 50 connected between the attachment plug 46 and the primary winding of the transformer 48 and a low-voltage signal input network 52 which is connected across the secondary winding of the transformer 48. The high-voltage power supply network 50 is connected to the burner actuator 28 and the motor driven water circulation pump 32 by lines 54 and 56 across normally-open relay switches 58 and 60, respectively. These relay switches 58 and 60 are jointly associated with a single relay coil 62 which is provided in the low-voltage signal input network 52 connected to the secondary winding of the transformer 48. The relay switches 58 and 60 are thus closed concurrently when the relay coil 62 is energized. Designated by reference numerals 64 and 66 are a power supply switch and an overcurrent protective fuse, respectively, which are incorporated into the high-voltage power supply network 50. The low-voltage signal input network 52 comprises, in addition to the relay coil 62, lines 68a, 68b and 68c which are connected in parallel between the terminals of the secondary winding of the transformer 48 through the relay coil 62 and across switches 70a, 70b and 70c, respectively. These switches 70a, 70b and 70c are provided in association with the terminal heating units 22a, 22b and 22c, respectively.

When any one of the switches 70a, 70b and 70c thus associated with the individual terminal heating units 22a, 22b and 22c, respectively, is closed with the attachment plug 46 connected to a convenience outlet (not shown) and the power supply switch 64 closed preliminarily, the relay coil 62 in the low-voltage signal input network 52 is energized through the secondary winding of the transformer 48 and causes the relay switches 58 and 60 in the high-voltage power supply network 50 to close concurrently. The burner actuator 28 in the water heating unit 20 and the motor-driven water circulation pump 32 are now energized through the relay switches 58 and 60 so that the fuel burner 26 of the water heating unit 20 is actuated to heat the water in the boiler 24 and at the same time the water circulation pump 32 is driven to pump hot water from the boiler 24 to the hot-water supply circuit 34 through the hot-water delivery pipe 30. The hot water thus delivered into the hot-water supply main line 36 and thereafter the hot-water supply branch lines 38a, 38b and 38c is passed to the individual terminal heating units 22a, 22b and 22c and liberates heat therein while the hot water is being circulated through each of the heating units 22a, 22b and 22c. The waste water is delivered from the respective return water outlets of the terminal heating units 22a, 22b and 22c and is passed back to the boiler 24 through the water return branch lines 44a, 44b and 44c and the water return main line 42 of the water return circuit 40.

One of the drawbacks of a conventional hot-water heating system of the above described nature is that all of the terminal heating units 22a, 22b and 22c are rendered operative and as a consequence a zone which need not be or is not desired to be heated must be heated when only one or some of the switches 70a, 70b and 70c respectively associated with the heating units 22a, 22b and 22c is or are closed. This not only involves waste of the heat energy generated by the boiler 24 and accordingly of the fuel consumed by the fuel burner 26 but would discomfort an occupant, if any, of the zone which is heated unnecessarily or contrary to the occupant's will. The hot-water heating system of the nature shown in FIG. 1 is further disadvantageous in that provision of an extra electric control circuit is required for the control of the burner actuator 28 and the water circulation pump 32 and in that laborious and time consuming works are required for the wiring of the control circuit, especially for the wiring of the low-voltage signal input circuit 52 for the individual zones in which the terminal heating units 22a, 22b and 22c are installed. The present invention contemplates elimination of these drawbacks inherent in a remote-controlled, multizone, forced-circulation hot-water or chilled-water central heating or cooling system of the general nature illustrated in FIG. 1.

Figure 2:
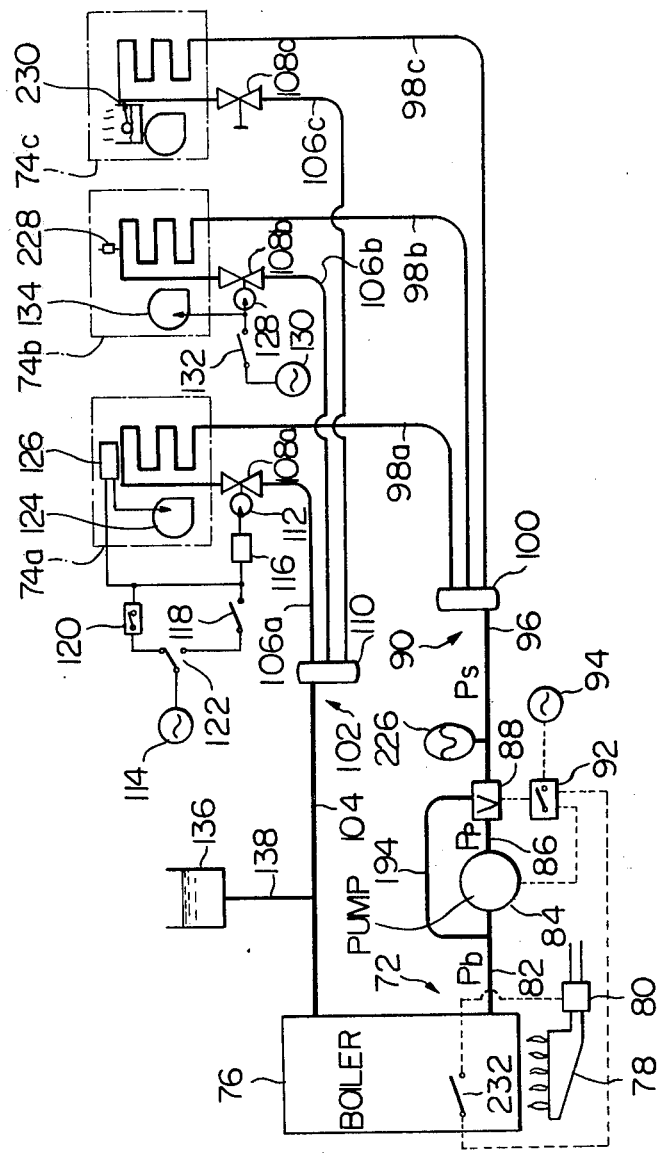
FIG. 2 is a view similiar to FIG. 1 but shows a first preferred embodiment of a central air-conditioning system according to the present invention.

FIG. 2 schematically shows the overall arrangement of a preferred embodiment of the remote-controlled central air-conditioning system according to the present invention. The central air-conditioning system herein shown is exemplified as a hot-water heating system basically similar to the prior-art hot-water heating system illustrated in FIG. 1 and, thus, largely comprises a water heating unit 72 and a plurality of terminal heating units 74a, 74b and 74c which are respectively installed in zones to be air conditioned or heated. The terminal heating units are shown by way of example to be provided as three in number but it is apparent that the central air-conditioning system according to the present invention may comprise any desired number of terminal heat-exchange units. Each of the terminal heating units 74a, 74b and 74c is assumed to be constituted by an ordinary heat radiator or convector which per se is well known and which has a hot-water inlet and a return water outlet. The water heating unit 72 per se is also assumed by way of example to be similar to the water heating unit of the prior-art system of FIG. 1 and thus comprises a direct-fired hot-water boiler 76 having a fuel burner 78 provided with an electrically-operated burner actuator 80 which is adapted to start and shut off the fuel burner 78 when electrically energized and deenergized, respectively,. Though not shown, the fuel burner 78 is in communication or communicable with a suitable source of fuel such as a combustible gas through a valve passageway, as is customary. The boiler 76 is of the water recirculation type and thus has a hot water outlet through which to deliver the hot water generated in the boiler 76 and a return-water inlet through which the water which has been cooled down in the individual terminal heating units 74a, 74b and 74c is to be returned to the boiler 76. The hot-water outlet of the boiler 76 is in communication through a hot-water delivery passageway 82 with the suction port of a motor-driven water circulation pump 84, the delivery port of which is in communication with a hot-water discharge passageway 86. The hot-water discharge passageway 86 in turn terminates in a pressure-responsive control valve unit 88 which is in communication with the respective hot-water inlets of the individual terminal heating units 74a, 74b and 74c through a hot-water supply circuit 90. The control valve unit 88 is constructed and arranged to have three functions of (1) detecting the flow rate of hot water through the valve unit 88 when the valve unit is open, (2) preventing the hot water from flowing backwardly through the valve unit 88 toward the water circulation pump 84 when the valve unit 88 is fully closed, and (3) constantly detecting the difference, if any, between the pressure of the water upstream of the water circulation pump 84, viz., in the hot-water delivery passageway 82 and the suction port of the pump 84 and the pressure of the water downstream of the control valve unit 88, viz., in the hot-water supply circuit 90. The control valve unit 88 is associated with and serves as a mechanical actuator for electric switching means 92 connected to an a.c. power source 94 and to the respective drivers (not shown) of the burner actuator 80 and the water circulation pump 84 as indicated by broken lines in FIG. 2. The details of the constructions and arrangements of the valve unit 88 and the switching means 92 will be described later.

The hot-water supply circuit 90 comprises a main hot-water supply passageway 96 leading from the control valve unit 88 and hot-water supply branch passageways 98a, 98b and 98c which are branched from the main hot-water supply passageway 96 through a flow distributing mainfold or header 100. The hot-water supply branch passageways 98a, 98b and 98c terminate in the respective hot-water inlets of the individual terminal heating units 74a, 74b and 74c. The respective return-water outlets of the terminal heating units 74a, 74b and 74c is in communication with a water return circuit 102 which comprises a main water passageway 104 terminating in the return-water inlet of the boiler 76 and water return branch passageways 106a, 106b and 106c leading from the respective return-water outlets of the individual terminal heating units 74a, 74b and 74c and jointly communicable through terminal valves 108a, 108b and 108c, respectively, with the main water return passageway 104 through a flow distributing manifold or header 110. Each of the terminal valves 108a, 108b and 108c has fully open and fully closed conditions between which the flow rate of water through the valve is continuously variable. When all the terminal valves 108a, 108b and 108c are fully closed and concurrently the control valve unit 88 at the upstream end of the water supply circuit 90 is fully closed, the water in the water supply circuit 90 and the terminal heating units 74a, 74b and 74c is confined therein so that the pressure of the water in the water supply circuit 90 and each of the terminal heating units 74a, 74b and 74c is maintained at a substantially fixed level. The water supply circuit 90 and the terminal heating units 74a, 74b and 74c (or more specifically the radiator coils of the heating units) under these conditions thus constitute a closed circuit maintaining a fixed water pressure therein. Such a closed circuit will be hereinafter referred to as pressure trapping circuit.

Each of the terminal valves 108a, 108b and 108c may be either of an electrically operated type as in the cases of the valves 108a and 108b for the terminal heating units 74a and 74b, respectively, or of a manually operated type as in the case of the valve 108c, for the terminal heating unit 74c. The electrically operated valve 108a for the terminal heating unit 74a has a driver such as a solenoid coil 112 connected to an a.c. power source 114 across a temperature-sensitive switch 116 and a parallel combination of a manually operated switch 118 and a timing switch 120 so that the valve 108a is closed either manually or at a preset timing and opened up and closed repeatedly depending upon the ambient temperature detected by the temperature-sensitive switch 116 which may use a thermostat as a temperature sensitive element. By preference, a selector switch 122 may be connected between the a.c. power source 114 and the combination of the switches 118 and 120 so as to selectively provide connection between the power source 114 and the manually operated switch 118 or between the power source 114 and the timing switch 120. If the terminal heating unit 74a is provided with a motor-driven blower 124 as shown, the blower 124 may be electrically connected to the a.c. power source 114 across a temperature-sensitive switch 126 and the parallel combination of the above mentioned manually operated switch 118 and timing switch 120 so that the blower 124 is repeatedly started and shut off depending upon the ambient temperature detected by the temperature-sensitive switch 126 which may also use a thermospat as a temperature sensitive element. If desired, the electrically operated terminal valve may be connected to the power source simply across one of the manually operated switch and the timing switch as in the case of the terminal valve 108b which has a driver or solenoid coil 128 connected to an a.c. power source 130 across a manually operated switch 132. The terminal heating unit 74b is also shown provided with a motor-driven blower 134. The blower 134 is electrically connected to the a.c. power source 130 across the above mentioned manually operated switch 132.

The piping arrangement of the heating system shown in FIG. 2 further includes an expansion tank 136 which is in constant communication with the main water return passageway 104 between the return water header 110 and the return-water inlet of the boiler 76 through an expansion pipe 138 for taking care of the expansion and contraction of water in the piping system. The expansion tank 136 has a predetermined raised position above the piping system so that a substantially constant, predetermined elavation head Ph is established on the piping system. The expansion tank 136 is shown to be of the open type but, if desired, a closed expansion tank may be put to use in lieu of the tank 136 shown.

Figure 3:
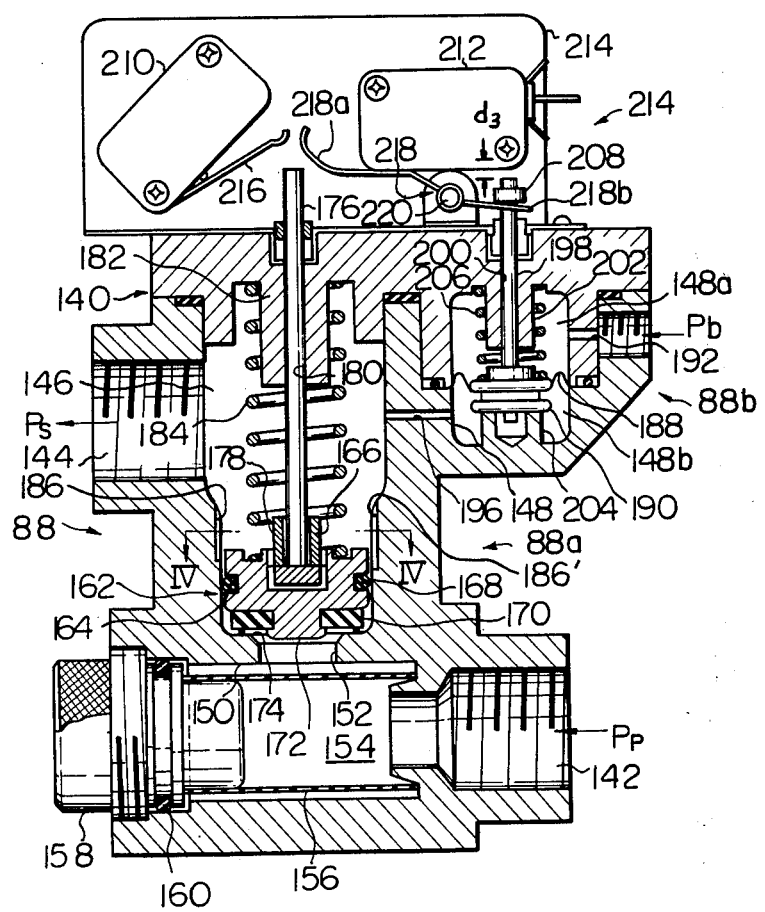
FIG. 3 is a sectional view showing a control valve unit forming part of the embodiment illustrated in FIG. 2.

Turning to FIG. 3, the control valve unit 88 playing an important role in the air-conditioning system embodying the present invention comprises a casing structure 140 which is formed with water inlet and outlet ports 142 and 144 which extend in directions substantially parallel with each other. The water inlet port 142 is in constant communication with the delivery port of the water circulation pump 84 through the hot-water discharge passageway 86 shown in FIG. 2 and the water outlet port 144 is in constant communication with the main hot-water supply passageway 96 of the hot-water supply circuit 90 shown in FIG. 2. The control valve unit 88 as a whole is constructed and arranged to have provided therein flow detecting and checking means 88a operative to detect the flow rate of hot water from the water inlet port 142 to the water outlet port 144 when communication is established between the ports 142 and 144 or to prevent passage of water from the water outlet port 144 back to the water inlet port 142 when the communication between the ports 142 and 144 is blocked and differential pressure detecting means 88b adapted to detect a difference, if any, between the pressure in the water in the water outlet port 144 and the pressure of the water upstream of the water circulation pump 84 shown in FIG. 2. To have accommodated such means 88a and 88b, the casing structure 140 of the valve unit 88 is further formed with first and second cavities or chambers 146 and 148 extending in directions which are substantially parallel with each other and which are preferably perpendicular to the directions in which the water inlet and outlet ports 142 and 144 extend as shown. The casing structure 140 internally has a wall portion 150 formed with an opening 152 at one longitudinal end of the first chamber 146. The casing structure 140 is further formed with an intermediate bore 154 which is in line with the water inlet port 142 and to which the opening in the internal wall portion 150 of the casing structure 140 is open as shown so that constant communication is established between the water inlet port 142 and the opening 152 in the wall portion 150 through the bore 154. A suitable dust strainer 156 consisting by way of example of a perforated tubular member may be fixedly positioned within the intermediate bore 154 so that fine solid particles such as boiler scales which may be contained in the hot water delivered from the boiler 76 are filtered out from the hot water entering the chamber 146 through the intermediate bore 154. The dust strainer 156 is held in position within the bore 154 by means of a threaded plug member 158 which is detachably screwed into the casing structure 140 with an annular sealing element 60 interposed between the plug member 158 and the casing structure 140 as shown.

The above mentioned flow detecting and checking means 88a comprises a generally disc-shaped valve element 162 which is axially movable within the first cavity 146 toward and away from the internal wall portion 150 of the casing structure 140 between the chamber 146 and the intermediate bore 154. The valve element 162 is formed with an annular groove 164 in its outer peripheral wall portion and a recess 166 in its end wall portion opposite to the internal wall portion 150 of the casing structure 140 and has a resilient, annular sealing element 168 received in the groove 164. Furthermore, the valve element 162 has attached to its face close to the internal wall portion 150 of the casing structure 140 an annular pad 170 of a suitable resilient material such as a synthetic rubber and is formed with an axial projection 172 projecting toward the opening 152 in the internal wall portion 150 and securing the pad 170 to the valve element 162. The annular pad 170 thus mounted on the valve element 162 is larger in cross sectional area than the opening 152 in the internal wall portion 150 of the casing structure 140 so that the annular pad 170 is seated on the inner face of the internal wall portion 150 when the valve element 162 is moved into the axial position closest to the wall portion 150 as illustrated in FIG. 3. The internal wall portion 150 of the casing structure 140 thus forms a valve seat 174 on its inner face defining one longitudinal end of the chamber 146 in the casing structure 140.

An elongated valve stem 176 is fixedly connected at one end to a cylindrical retaining member 178 which is fastened to the valve element 162 through the recess 166 in the valve element 162 in such a manner that a small amount of allowance is provided radially between the valve element 162 and the retaining member 178 so that the retaining member 178 and accordingly the valve stem 176 are allowed to slightly move sidewise of the valve element 162. The valve stem 176 axially extend in a direction opposite to the opening 152 in the internal wall portion 150 of the casing structure 140 and projects out of the casing structure 140 through an elongated bore 180 formed in a wall portion of the casing structure 140. The wall portion thus formed with the elongated bore 180 forms in part an internal land 182 projecting into the chamber 146 toward the valve element 162 and constitutes stop means for limiting the movement of the valve element 162 away from the opening 152 in the internal wall portion 150 of the casing structure 140. The valve element 162 is urged to axially move toward the opening 152 in the internal wall portion 150 of the casing structure 140, viz., toward the axial position to fully close the opening 152 by the annular pad 170 thereon by suitable biasing means such as a preloaded helical compression spring 184 which is positioned substantially in parallel with the valve stem 176 and which is seated at one end on the inner face of the valve element 162 and at the other end in an annular groove surrounding the land 182 forming part of the casing structure 140. The valve element 162 has formed in its inner end wall facing the land 182 an annular groove in which the compression spring 184 is seated at one end thereof.

Figure 4:
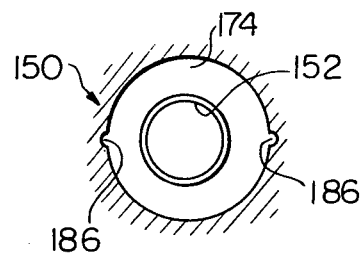
FIG. 4 is a cross section taken on line IV—IV in FIG. 3.

The casing structure 140 further has a suitable number of grooves formed in its wall portion formed with the chamber 146 thus accommodating the valve element 162, the grooves being herein assumed as two in number as indicated by 186 and 186' in FIG. 4. The grooves 186 and 186' extend substantially in parallel with the direction in which the valve element 162 is movable within the chamber 146 and are sized and located in predetermined relationship to the axial movement of the valve element 162 in the neighborhood of the valve seat 174 on the internal wall portion 150 of the casing structure 140. More specifically, each of the grooves 186 and 186' has one end axially open to the chamber 146 in a direction opposite to the valve seat 174 and the other end axially closed and located at a predetermined distance from the valve seat 174. The annular sealing element 168 on the valve element 162 is in close contact with the internal wall surface portion of the casing structure 140 forming the chamber 146 when the valve element 162 is axially positioned to have the sealing element 168 located anywhere between the valve seat 174 on the internal wall portion 150 of the casing structure 140 and the axially closed ends of the grooves 186 and 186' as shown. When the valve element 162 is in such an axial position with respect to the casing structure 140, the water outlet port 144 in the casing structure 140 is isolated by the sealing element 168 from the opening 152 in the internal wall portion 150 of the casing structure 140. When the valve element 162 is axially positioned to have the sealing element 168 located on the grooves 186 and 186', restricted communication is provided between the opening 152 in the internal wall portion 150 and the water outlet port 144 in the casing structure 140 through the grooves 186 and 186' and allows the water in the water inlet port 142 to flow to the water outlet port 144 by way of the intermediate bore 154 downstream of the inlet port 142 and the opening 152 in the internal wall portion 150, past the annular pad 170 on the valve element 162 and through the grooves 186 and 186' forming part of the chamber 146. The flow rate of the water from the water inlet port 142 to water outlet port 144 under these conditions depends on the sum of the cross sectional areas of the grooves 186 and 186'. The number of the grooves to be formed in the casing structure 140 and/or the cross sectional area of each of the grooves are, thus, selected in such a manner as to provide a desired flow rate of water from the water inlet port 142 to the water outlet port 144. Although, furthermore, the grooves 186 and 186' are shown to be located substantially in diametrically opposed relationship to each other across the center axis of the chamber 146, the grooves to be formed in the casing structure 140 may be located in cross section in any desired manner with respect to the valve element 162 insofar as the grooves are axially sized and located in the above described relationship to the axial movement of the valve element 162 within the chamber 146.

The differential pressure detecting means 88b provided in the second chamber 148 in the casing structure 140 comprises a flexible diaphragm element 188 carrying thereon a disc member 190 which is axially movable within the chamber 148 in a direction substantially parallel with the direction in which the valve element 162 of the flow detecting and checking means 88a is axially movable within the first chamber 146. The diaphragm element 188 is securely connected along its outer peripheral end portion to the casing structure 140 so that the diaphragm element 188 and the disc member 190 thereon divide the second chamber 148 into separate first and second variable-volume compartments 148a and 148b which are complementarily expansible and contractable depending upon the relative axial position of the diaphragm element 188 to the casing structure 140. The first variable-volume compartment 148a is in constant communication with the hot-water delivery passageway 82 between the hot-water outlet of the boiler 76 and the suction port of the water circulation pump 84 (FIG. 2) through a port 192 formed in the casing structure 140 and a passageway 194 providing communication between the port 192 and the hot-water delivery passageway 82 as shown in FIG. 2. In the first variable-volume compartment 148a is thus developed the pressure Pb of the hot water which is delivered from the boiler 76 to the water circulation pump 84. The first variable-volume compartment 148a will thus be hereinafter referred to as before-pump pressure compartment. The pressure Pb of the hot water delivered from the boiler 76 is approximately equal to the elevation head Ph produced by the expansion tank 136. On the other hand, the second variable-volume compartment 148b is in constant communication with the hot-water supply circuit 90 through, for example, a passageway 196 which is formed in the casing structure 140 to provide communication between the second variable-volume compartment 148b and the first chamber 146 in the casing structure 140. In the second variable-volume compartment 148b is thus developed the pressure Ps of the hot water in the hot-water supply circuit 90 (FIG. 1). The second variable-volume compartment 148b will therefore be hereinafter referred to as supply-water pressure compartment.

An elongated plunger rod 198 is securely connected at one end to the disc member 190 on the diaphragm element 188. The plunger rod 198 axially extends throughout the first or before-pump pressure compartment 148a substantially in parallel with the valve stem 176 of the flow detecting and checking means 88a and projects out of the casing structure 140 axially movably through an elongated bore 200 formed in a wall portion of the casing structure 140. The particular wall portion of the casing structure 140 which is thus formed with the elongated bore 200 internally forms a land 202 which axially projects into the before-pump pressure compartment 148a toward the disc member 190 on the diaphragm element 188. The internal land 202 serves as stop means for limiting the distance of axial movement of the disc member 190 on the diaphragm element 188 in a direction to contract the before-pump pressure compartment 148a. The casing structure 140 further has a wall portion which is internally formed with a land 204 which axially projects into the second or supply-water pressure compartment 148b toward the disc member 190 on the diaphragm element 188. The internal land 204 serves as stop means for limiting the distance of axial movement of the disc member 190 in a direction to contract the supply-water pressure compartment 148b. The diaphragm element 188 and the disc member 190 are urged to axially move or deform in the direction to contract the supply-water pressure compartment 148b by suitable biasing means such as a preloaded compression spring 206 which is positioned within the before-pump pressure compartment 148a substantially in parallel with the plunger rod 198 and which is seated at one end on one face of the disc member 190 and at the other end in an annular groove formed in the casing structure 140 around the land 202 as shown. The plunger rod 198 has a flange 208 which is integrally formed or fixedly mounted on an outwardly projecting end portion of the plunger rod 198.

The switching means 92 associated with the control valve unit 88 thus constructed and arranged comprises first and second limit switch assemblies 210 and 212 which are mounted on a bracket 214 fixed on the casing structure 140 of the control valve unit 88. The first limit switch assembly 210 includes a cantilevered actuating element 216 which is located to be engageable with an outwardly projecting axial end portion of the valve stem 176 of the flow detecting and checking means 88a of the control valve unit 88. The actuating element 216 is urged to stay in a position to hold the limit switch assembly 210 open by suitable biasing means (not shown) so that the switch assembly 210 is normally open. The first limit switch assembly 210 is constructed to be closed when the actuating element 216 thereof is being engaged by the valve stem 176. On the other hand, the second limit switch assembly 212 includes an actuating element 218 which has an intermediate fulcrum or eyelet portion rotatably mounted on a pin 220 projecting from the bracket 214 in a direction substantially perpendicular to a plane on which the valve stem 176 of the flow detecting and checking means 88a and the plunger rod 198 of the differential pressure detecting means 88b are axially movable. The actuating element 218 of the second limit switch assembly 212 has first and second arm portions 218a and 218b extending generally in opposite directions from the above mentioned fulcrum or eyelet portion of the element 218. The first arm portion 218a of the actuating element 218 is located to be engageable with the outwardly projecting axial end portion of the valve stem 176 and the second arm portion 218b of the actuating element 218 is located to be engageable with an outwardly projecting axial end portion of the plunger rod 198 of the differential pressure detecting means 88b. When the actuating element 218 is thus engaged and pressed upon by the valve stem 176 of the flow detecting and checking means 88a or the plunger rod 198 of the differential pressure detecting means 88b, the actuating element 218 is caused to turn in clockwise direction in FIG. 3 about the center axis of the pin 220 supporting the actuating element 218. The actuating element 216 of the second limit switch assembly 212 is also urged to stay in a position to hold the limit switch assembly 212 open by suitable biasing means (not shown) so that the limit switch assembly 212 is normally open. Being different from the first limit switch assembly 210, the second limit switch assembly 212 is constructed and arranged in such a manner as to be closed at a predetermined short interval after the actuating element 218 thereof is initially engaged by the valve stem 176 or the plunger rod 198.

The second limit switch 212 is arranged so that the first arm portion 218a of its actuating element 218 is to be engaged and pressed upon by the outwardly projecting axial end portion of the valve stem 176 when the valve stem 176 assumes an axial position outwardly projecting from the casing structure 140 over a distance greater than a first predetermined value $d_1$ (FIG. 6) from its axial position retracted the above mentioned maximum distance into the casing structure 140, viz., when the valve element 162 is axially moved away from the opening 152 in the internal wall portion 150 of the casing structure 140 over a distance which is greater than the predetermined value $d_1$ from its axial position having the pad 170 closely seated on the valve seat 174 on the internal wall portion 150 of the casing structure 140. On the other hand, the first limit switch assembly 210 is arranged to have its actuating element 216 engaged and pressed upon by the outwardly projecting end portion of the valve stem 176 when the valve stem 176 assumes an axial position outwardly projecting from the casing structure 140 over a distance greater than a second predetermined value (FIG. 6) $d_2$ from its axial position retracted a maximum distance into the casing structure 140, viz., when the valve element 162 to which the valve stem 176 is connected is axially moved away from the opening 152 in the internal wall portion 150 of the casing structure 140 over a distance which is greater than the predetermined value $d_2$ from its axial position having the annular pad 170 closely steated on the valve seat 174 on the internal wall portion 150. The second predetermined value $d_2$ of the distance of movement of the valve stem 176 is greater than the previously mentioned first predetermined value $d_1$. The above described grooves 186 and 186' forming part of the chamber 146 in the casing structure 140 are sized and located with respect to the axial movement of the valve element 162 in such a manner that the above mentioned first and second predetermined distances $d_1$ and $d_2$ of movement of the valve element 162 from its axial position having the annular bad 170 seated on the valve seat 174 on the internal wall portion 150 of the casing structure 140 are contained within the range of the axial position of the valve element 162 located to have the sealing element 168 on the grooves 186 and 186'. The second limit switch assembly 212 is further arranged in such a manner that the second arm portion 218b of its actuating element 218 is to be engaged by and pressed upon by the flange 208 on the outwardly projecting axial end portion of the plunger rod 198 when the plunger rod 198 is in an axial position retracted into the casing structure 140 over a distance greater than a third predetermined value $d_3$ (FIG. 3) from its axial position outwardly projecting over a maximum distance from the casing structure 140, viz., when the disc member 190 on the diaphragm element 188 to which the plunger rod 198 is connected is axially moved a distance greater than the third predetermined value $d_3$ from its axial position seated on the land 202 projecting into the before-pump pressure compartment 148a of the chamber 148 in the casing structure 140. The first and third predetermined values $d_1$ and $d_3$ of the distances of movement of the valve stem 176 and the plunger rod 198, respectively, are selected so that the angle of rotation of the actuating element 218 turned by the valve stem 176 moved axially outwardly over over the distance $d_1$ from its limit position retracted into the casing structure 140 is substantially equal to or slightly smaller than the angle of rotation of the actuating element 218 turned by the plunger rod 198 moved axially inwardly over the distance $d_3$ from its limit position projecting outwardly from the casing structure 140.

The first limit switch assembly 210 is electrically connected in series between the a.c. power source 94 (FIG. 2) and the motor (not shown) of the water circulation pump 84, which is accordingly adapted to be put into operation when the first limit switch assembly 210 is closed. Likewise, the second limit switch assembly 212 is electrically connected in series between the a.c. power source 94 and the driver such as for example a solenoid coil of the burner actuator 80 of the water heating unit 72, viz., in parallel with the series combination of the first limit switch assembly 210 and the motor of the water circulation pump 84. The burner actuator 80 is thus also adapted to be put into operation when the second limit switch assembly 212 is closed. An example of the circuit arrangement incorporating the first and second limit switch assemblies is not herein shown but may be readily constructed by those skilled in the art.

The operation of the central air-conditioning system thus constructed and arranged will be hereinafter described with concurrent reference to FIGS. 2 to 4 and further to FIGS. 5 and 6 which are graphic representations of some operational conditions of the air-conditioning system.

When all of the manually or automatically operated terminal valves 108a, 108b and 108c associated with the individual terminal heating units 74a, 74b and 74c, respectively, are kept closed, the pressure Ps of the water confined in a hot-water supply circuit 90 with the control valve unit 88 fully closed is maintained at the level developed in the circuit 90 at the end of the last operation of the system, while both the pressure Pb of the water upstream of the water circulation pump 84 and the pressure, denoted by Pr, of the water in the water return circuit 102 downstream of the individual terminal valves 108a, 108b and 108c are maintained at levels which are approximately equal to the elevation head Ph produced by the water stored in the expansion tank 136. The water circulation pump 84 being held inoperative, furthermore, the pressure by Pp developed at the delivery port of the pump 84, viz., in the passageway 194 leading to the port 192 in the casing structure 140 is also maintained at a level approximating the elevation head Ph. Under these conditions, the force resulting from the water pressure Pp acting on the valve element 162 of the flow detecting and checking means 88a from the water inlet port 142 through the intermediate bore 154 and the opening 152 in the casing structure 140 is overcome by the sum of the force of the compression spring 184 and the force resulting from the water pressure Ps acting on the valve element 162 from the water outlet port 144 through the chamber 146 in the casing structure 140 so that the valve element 162 is held in the axial position having the pad 170 closely seated on the valve seat 174 on the internal wall portion 150 of the casing structure 140 and thereby closing the opening 152 in the internal wall portion 150. The water in the hot-water supply circuit 90 is thus prevented from being allowed back into the hot-water discharge passageway 86 intervening between the water circulation pump 84 and the control valve unit 88 serving as a check valve. With the valve element 162 held in the axial position closest to the valve seat 174 on the internal wall portion 150 of the casing structure 140, furthermore, the valve stem 176 is maintained in the axial position retracted a maximum distance into the casing structure 140 and is accordingly disengaged from the respective actuating elements 216 and 218 of both of the first and second limit switch assemblies 210 and 212 as illustrated in FIG. 3. In the differential pressure detecting means 88b of the control valve unit 88, the force resulting from the water pressure Ps acting on the diaphragm element 188 from the supply-water pressure compartment 148b is greater than the sum of the force of the compression spring 206 acting on the disc member 190 and the force resulting from the water pressure Pb acting on the diaphragm element 188 from the before-pump pressure compartment 148a so that the diaphragm element 188 is maintained in the position having the disc member 190 seated on the land 202 projecting into the before-pump pressure compartment 198a. The plunger rod 198 connected to the disc member 190 is therefore held in the axial position outwardly projecting a maximum distance from the casing structure 140 and has the flange 208 disengaged from the second arm portion 218b of the actuating element 218 of the second limit switch assembly 212 as illustrated in FIG. 3. The respective actuating elements 216 and 218 of the first and second limit switch assemblies being thus disengaged from the valve stem 176 of the flow detecting and checking means 88a and the plunger rod 198 of the differential pressure detecting means 88b in the control valve unit 88, both of the first and second limit switch assemblies 210 and 212 are kept open and maintain the burner actuator 80 of the water heating unit 72 and the water circulation pump 84 de-energized. The water heating unit 72 and the motor-driven water circulation pump 84 are in this fashion held inoperative when all of the terminal valves 108a, 108b and 108c associated with the individual terminal heating units 74a, 74b and 74c are kept closed. When the heating system is held under these conditions, the water supply circuit 90 and the individual terminal heating units 74a, 74b and 84c (or, more specifically, the respective radiator coils of the terminal heating units) constitute the previously mentioned pressure trapping circuit maintaining therein the water pressure at the particular level developed in the circuit at the end of the last operation of the system. (In this respect it may be noted that actually the water pressure in the pressure trapping circuit will slightly vary from the level developed at the end of the last operation of the system as the pipes and fittings constituting the circuit and the radiator coils of the terminal heating units as well as the water confined therein are cooled down and thermally contracted as the time lapses.) The water pressure thus established in the pressure trapping circuit is indicated at $P_1$ in the graph of FIG. 5 which shows the relationship between the flow rate of water through the control valve unit 88 and the pressure Ps of the water passed through the valve unit 88, viz., developed in the main hot-water supply circuit 90 under various operating conditions of the system.

When, now, one of the terminal valves 108a, 108b and 108c such as, for example, the terminal valve 108a associated with the terminal heating unit 74a is opened up with the switch 118 closed manually or with the timing switch 120 closed automatically, then the water which has been confined in the pressure trapping circuit is allowed to flow through the particular terminal valve 108a into the water return branch passageway 106a and then through the return-water flow distributing header 110 into the main water return passageway 104. The water pressure Ps which has been maintained at the level $P_1$ in the pressure trapping circuit is therefore reduced toward the level of the elevation head Ph which has been established in the water return circuit 102. When the water pressure Ps in the hot-water supply circuit 90 thus reaches a predetermined level $P_2$ which is lower by a predetermined value (see FIG. 5) than the elevation head Ph established in the suction port of the water circulation pump 84, viz., in the passageway 194 leading to the port 192 in the casing structure 140 of the control valve unit 88, the force resulting from the water pressure Ps in the supply-water pressure compartment 148b in the differential pressure detecting means 88b is overcome by the sum of the force of the compression spring 206 acting on the diaphragm element 188 and the force resulting from the water pressure Pb in the before-pump pressure compartment 148a and allows the diaphragm element 188 to move together with the disc member 190 away from the land 202 projecting into the before-pump pressure compartment 148a, thereby causing the plunger rod 198 to axially retract into the casing structure 140. When the plunger rod 198 is thus axially moved the previously mentioned third predetermined distance $d_3$ from the initial position thereof, the flange 208 on the plunger rod 198 is brought into pressing engagement with the second arm portion 218b of the actuating element 218 of the second limit switch assembly 212 so that the normally-open second limit switch assembly 212 is caused to close and makes up a closed loop through the a.c. power source 94 and the motor of the water circulation pump 84. The motor-driven water circulation pump 84 is now initiated into operation to deliver pressurized water to the control valve unit 88 and raises the water pressure Pp in the water inlet port 142 and the intermediate bore 154 in the casing structure 140 of the valve unit 88. The water pressure Ps in the hot-water supply circuit 90 being declined down to the above mentioned level $P_2$ and at the same time the water pressure Pp in the water inlet port 142 of the control valve unit 88 being thus raised with the water circulation pump 84 put into operation, the sum of the force resulting from the water pressure Ps in the chamber 146 and the force of the compression spring 184 acting on the valve element 162 in the flow detecting and checking means 88a in the control valve unit 88 is overcome by the force resulting from the water pressure Pb acting on the valve element 162 through the opening 152 in the internal wall portion 150 of the casing structure 140 from the water inlet port 142. The valve element 162 of the flow detecting and checking means 88a is therefore axially moved away from the valve seat 174 on the internal wall portion 150 of the casing structure 140 and causes the annular pad 170 on the valve element 162 to be unseated from the valve seat 174. Until the point of time at which the valve element 162 is moved a predetermined distance $D_1$ from its initial axial position, the annular sealing element 168 on the valve element 162 is located short of the axial grooves 186 and 186' forming part of the chamber 146 in the casing structure 140 so that there is no flow of water past the valve element 162 as will be seen from the curve of FIG. 6 which shows the relationship between the distance of movement of the valve element 162 from its initial axial position and the flow rate of water through the opening 152 in the internal wall portion 150 of the casing structure 140. When the valve element 162 is moved a distance greater than the predetermined value $D_1$ from its initial axial position, the annular sealing element 168 on the valve element 162 is located on the axial grooves 186 and 186' in the casing structure 140 so that the water in the water inlet port 142 and the intermediate bore 154 in the casing structure 140 is allowed to flow into the chamber 146 through the opening 152 and the grooves 186 and 186' at a limited rate which increases as the valve element 162 is axially moved away from the valve seat 174 on the internal wall portion 150 of the casing structure 140, as will be also seen from the curve of FIG. 6. When the limited flow rate of water past the valve element 162 reaches a predetermined value $f_1$, the valve element 162 and accordingly the valve stem 176 are located at the previously mentioned first predetermined distance $d_1$ from the initial axial position thereof and, as a consequence, the valve stem 176 is brought into pressing engagement with the first arm portion 218a of the actuating element 218 of the second limit switch assembly 212. The actuating element 218 of the second limit switch assembly 212 is thus maintained in the position holding the limit switch assembly 212 closed even though the diaphragm element 188 and accordingly the plunger rod 198 of the differential pressure detecting means 88b may be moved backwardly toward their respective initial positions and as a consequence the flange 208 of the plunger rod 198 may be disengaged from the second arm portion 218b of the actuating element 218 when the water pressure Ps in the supply-water pressure compartment 148b of the differential pressure detecting means 88b is in creased to such a level that the force resulting from the water pressure Ps overcomes the opposing forces exerted on the diaphragm element 188. As the valve element 162 and accordingly the valve stem 176 are further moved, the flow rate of water through the valve element 162 increases gradually as indicated by curve m in the graph of FIG. 5. When the flow rate of water through the control valve unit 88 is increased to a predetermined value $f_2$ which is slightly higher than the previously mentioned predetermined value $f_1$, then the valve element 162 and the valve stem 176 reach the axial positions respectively displaced the previously mentioned second predetermined distance $d_2$ from their respective initial axial positions. As a consequence, the valve stem 176 is brought into pressing engagement with the actuating element 216 of the first limit switch assembly 210, which is accordingly caused to close, thereby making up a closed loop through the a.c. power source 94 and the driver of the burner actuator 80 of the water heating unit 72. The burner actuator 80 is now put into operation to burn fuel supplied thereto and thus heat the water which has been stored in the boiler 76 with the result that the control valve unit 88 delivers hot, pressurized water to the hot-water supply circuit 90.

Figure 5:
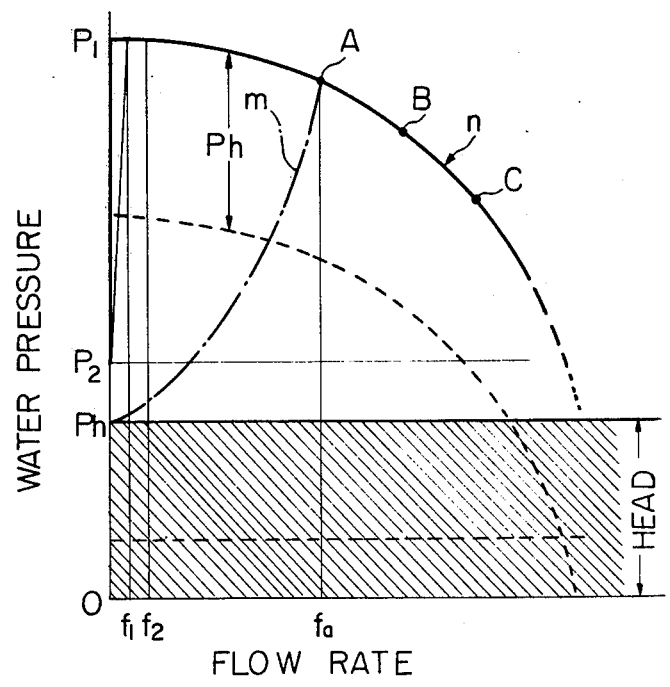
FIG. 5 is a graphic representation of the relationship between the flow rate and the pressure of the water in the main hot-water supply circuit of the embodiment shown in FIG. 2.
Figure 6:
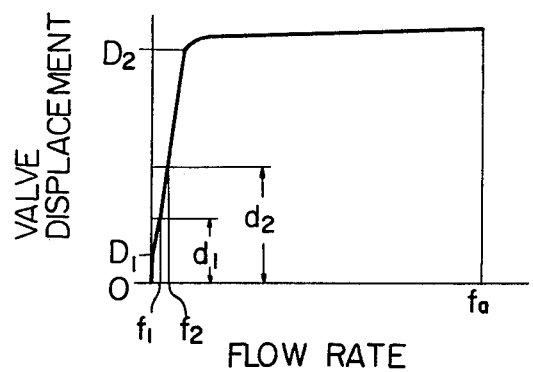
FIG. 6 is a graphic representation of the relationship between the flow rate of the water passed through the control valve unit shown in FIG. 3 and the distance of movement of the valve element incorporated in the valve unit.

As the valve element 162 of the flow detecting and checking means 88a in the control valve unit 88 is further axially moved away from the valve seat 174 on the internal wall portion 150 of the casing structure with the annular sealing element 168 being moved on the grooves 186 and 186' in the casing structure 140, the flow rate of water past the valve element 162 gradually increases as long as the distance of displacement of the valve element 162 from its initial axial position is smaller than a predetermined value $D_2$ as will be seen from the curve of FIG. 6. When the valve element 162 is moved beyond the predetermined distance $D_2$ from the intial axial position thereof, the annular sealing element 168 on the valve element 162 is moved past the grooves 186 and 186' in the casing structure 140 so that the hot water entering the water inlet port 142 of the control valve unit 88 is passed through the opening 152 in the internal wall portion 150 of the casing structure 140 to the chamber 146 and through the chamber 146 to the water outlet port 144 at a flow rate which is increased until the valve element 162 attains an equilibrium axial position in which the force of the flow of the water urging the valve element 162 toward the land 182 projecting into the chamber 146 is balanced with the opposing force of the compression spring 184 urging the valve element 162 toward the valve seat 174 on the internal wall portion 150 of the casing structure 140. When the valve element 162 reaches such an equilibrium axial position, the flow rate of the hot water past the valve element 162 is approximately fixed at a certain maximum value $f_a$ which is dictated by the capacity of the water circulation pump 84 and the dimensions of the component parts of the flow detecting and checking means 88a in the control valve unit 88. When the flow rate of the water passed through the control valve unit 88 thus reaches the level $f_a$ as shown in FIG. 6, the pressure Pr in the hot-water supply circuit 90 becomes stable as indicated at point A on curve n in the graph of FIG. 5. If the terminal valve 108b associated with the terminal heating unit 74b and then the terminal valve 108c associated with the terminal heating unit 74c are opened up thereafter, the pressure of the water in the hot-water supply circuit 90 is diminished as indicated at points B and C, respectively, on the curve n shown in FIG. 5. Theoretically, the pressure Ps of the water in the hot-water supply circuit 90 droops toward the elevation head Ph with an increase in the flow rate of water through the control valve unit 88 when an increased nunber of terminal heating units are put into operation as indicated by a broken line extended from the curve n in FIG. 5.

If one of the terminal valves 108a, 108b and 108c which have been open is closed, the flow rate of the water in the hot-water supply circuit 90 and accordingly through the control valve unit 88 is caused to diminish and accordingly the pressure Pr in the hot-water supply circuit 90 rises stepwise as from the level indicated at point C to the level indicated at point B in the graph of FIG. 5 if the terminal valve 108c is closed. If, thus, the terminal valve 108c and thereafter the terminal valve 108b are successively closed to cut off the flows of hot water therethrough and then the remaining terminal valve 108a is operated to close, the flow rate of water through the control valve unit 88 is reduced toward the previously mentioned predetermined value $f_2$ (FIGS. 5 and 6). As the flow rate of the hot water through the control valve unit 88 is thus diminished, the flow of the hot water from the opening 152 in the internal wall portion 150 of the casing structure 140 into the chamber 146 becomes unable to have the valve element 162 supported in the above mentioned equilibrium axial position within the chamber 146 with the result that the valve element 162 and accordingly the valve stem 176 are axially moved toward the valve seat 174 on the internal wall portion 150 of the casing structure 140. When the predetermined value $f_2$ is then reached by the flow rate of the hot water through the control valve unit 88, the valve element 162 and the valve stem 176 are located at the predetermined distance $d_2$ from the valve seat 174 on the internal wall portion 150 of the casing structure 140. As the valve element 162 is further moved from such an axial position toward the valve seat 174 on the internal wall portion 150 of the casing structure 140, the valve stem 176 is disengaged from the actuating element 216 of the normally-open first limit switch assembly 210 and allows the switch assembly 210 to open. The driver or solenoid coil of the burner actuator 80 of the water heating unit 72 is therefore disconnected from the a.c. power source 94 and is accordingly de-energized, thereby shutting off the fuel burner 78. As the flow rate of the hot water through the control valve unit 88 is reduced and reaches the predetermined value $f_1$ (FIGS. 5 and 6), the valve element 162 and the valve stem 176 assume the axial positions spaced apart the predetermined distance $d_1$ from the valve seat 174 on the internal wall portion 150 of the casing structure 140. When the valve element 162 is moved beyond such an axial position, the valve stem 176 is disengaged from the first arm portion 218a of the actuating element 218 of the second limit switch assembly 212. The normally-open second switch assembly 212 is accordingly allowed to open and de-energizes the motor of the water circulation pump 84, which is accordingly shut off and ceases delivery of hot water therefrom. By a certain point of time after the valve element 162 is initially moved to open up the control valve unit 88, the diaphragm element 188 of the differential pressure detecting means 88b in the control valve unit 88 is moved back into its initial position having the disc member 190 seated on the land 202 with the result that the flange 208 on the plunger rod 198 connected to the disc member 190 is disengaged from the second arm portion 218b of the actuating element 218 because the water pressure Ps in the supply-water pressure compartment 148b has been increased to such a level as to overcome the sum of the force of the compression spring 206 and the force resulting from the water pressure Pb in the before-pump pressure compartment 148a by such a point of time. The actuating element 218 of the second limit switch assembly 212 is therefore allowed to turn about the center axis of the pin 220 into its angular position allowing the switch assembly 212 to open when the first arm portion 218a of the actuating element 218 is disengaged from the valve stem 176 connected to the valve element 162 of the flow detecting and checking means 88a.

When the water circulation pump 84 is shut off as above described, there is produced a sudden decrease in the water pressure in the water inlet port 142 and the intermediate bore 154 in the casing structure 140 of the control valve unit 88. The valve element 162 of the flow detecting and checking means 88a in the control valve unit 88 is therefore moved by the aid of the compression spring 184 into the axial position having the annular pad 170 closely seated on the valve seat 174 on the internal wall portion 150 of the casing structure 140 and thus serves as a one-way check valve preventing the flow of water from the chamber 146 back into the intermediate bore 154 and the water inlet port 142 in the casing structure 140. The water staying in the hot-water supply circuit 90 is now confined in the pressure trapping circuit between the water outlet port 144 of the control valve unit 88 and the individual terminal valves 108a, 108b and 108c and is maintained at a fixed high pressure approximating the water pressure $P_1$ which was developed in the hot-water supply circuit 90 immediately before the control valve unit 88 is closed.

From the foregoing description it will have been understood that the embodiment of the present invention as illustrated in FIGS. 2 to 4 is advantageous over prior-art air-conditioning or heating systems primarily because those terminal units which need not be put into operation are not compelled to deliver its outputs and because intricate and accordingly costly circuit arrangements need not be incorporated into the system. Because, furthermore, of the fact that the burner actuator 80 for the boiler 76 and the water circulation pump 84 depend for their operations upon the differential pressure between the suction port of the pump 84 and the hot-water supply circuit 90 and upon the flow rate of the water through the control valve unit 88 when they are to be started and shut off, the performance characteristics of the system as a whole are free from the influences of the fluctuations in the water pressures in the system due to the variation and/or irrugular distribution, if any, in the temperature of the system and are compatible with water circulation pumps having any ordinary capacities which may be subject to variation or fluctuations during operation. These advantages of the air-conditioning system embodying the present invention as hereinbefore described may be enhanced by modifying the embodiment in the following manners.

Figure 7:
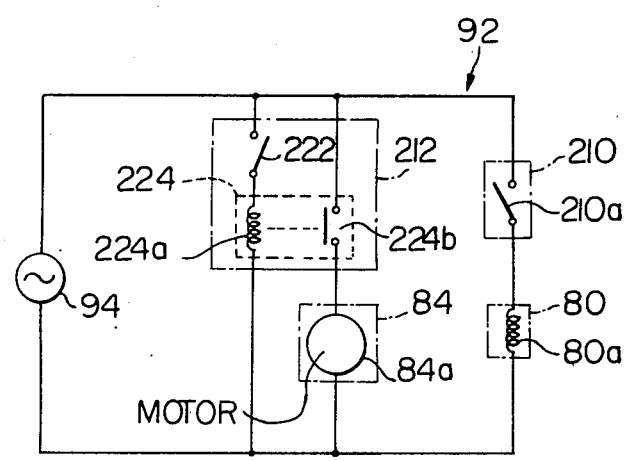
FIG. 7 is a schematic view showing a preferred example of an electric switching circuit incorporated in the embodiment of FIG. 2.

When only one of the terminal heating units 74a, 74b and 74c is put into operation and the particular terminal valve, which may be the valve 108a for example, is being closed to such an extent as to produce a flow rate lower than the predetermined value $f_1$ which can be detected by the flow detecting and checking means 88a in the control valve unit 88, it may happen in the differential pressure detecting means 88b that the force resulting from the water pressure Ps in the supply-water pressure chamber 148b is instantaneously and temporarily overcome by the sum of the force of the compression spring 206 and the force resulting from the water pressure Pb in the before-pump pressure compartment 148a. When this occurs, the water circulation pump 84 is started and shut off for a short while or frequently. The second limit switch assembly 212 which dictates the operation of the water circulation pump 84 has been described to be electrically connected in series with the a.c. power source 94 and the motor of the pump 84 but may be connected therebetween through a suitable delay circuit to avoid such a problem. FIG. 7 illustrates a preferred example of the circuit arrangement incorporating such a delay circuit in combination with the first and second limit switch assemblies 210 and 212.

Referring to FIG. 7, the first limit switch assembly 210 includes a normally-open switch element 210a which is connected across the above mentioned a.c. power source 94 in series with the driver such as a solenoid coil 80a of the burner actuator 80 of the water heating unit 72. The second limit switch assembly 212 is composed of a normally-open switch element 222 connected in parallel with the series combination of the solenoid coil 80a of the burner actuator 80 and the switch element 210a of the first limit switch assembly 210 and a delay circuit which is constituted by a relay 224 consisting of a relay coil 224a connected in series with the switch element 222 across the a.c. power source 94 and a normally-open contact set 224b which is connected across the a.c. power source in series with the motor 84a (or a driver for suitable switch means connected to the motor if desired) and in parallel with the series combination of the switch element 222 and the coil 224a and which is adapted to close when the relay coil 224a is genergized from the a.c. power source 94. The switch element 222 of the second limit switch assembly 212 is provided in association with the previously described actuating element 218 of the limit switch assembly 212 so as to be closed when the actuating element 218 is engaged and pressed upon by the valve stem 176 of the flow detecting and checking means 88a or by the plunger rod 198 of the differential pressure detecting means 88b of the control valve unit 88 shown in FIG. 3.

When, in operation, the plunger rod 198 of the differential pressure detecting means 88b in the control valve unit 88 is axially moved a distance greater than the predetermined value $d_3$ from its axial position having the disc member 190 on the diaphragm element 188 seated on the land 202 of the casing structure 140 and as a consequence the flange 208 on the plunger rod 198 is brought into pressing engagement with the second arm portion 218b of the actuating element 218 of the second limit switch assembly 212, then the actuating element 218 causes the normally-open switch element 222 of the second limit switch assembly 212 to close and energizes the coil 224a of the relay 224 from the a.c. power source 94 through the switch element 222. At a predetermined short interval after the relay coil 224a is thus energized from the a.c. power source 94, the normally-open contact set 224b of the relay 224 is closed and makes up a closed loop through the a.c. power source and the motor 84a of the water circulation pump 84. If, therefore, the actuating element 218 of the second limit switch assembly 212 is only instantaneously engaged by the flange 208 on the plunger rod 198, the normally-open switch element 222 of the second limit switch assembly 212 is opened up before the contact set 224b of the relay 224 is caused to close by energization of the relay coil 224. The water circulation pump 84 is thus prevented from being put into operation unless the switch element 222 of the second limit switch assembly 212 is kept closed for a period of time longer than the particular delay time prescribed for the relay 224 constituting a delay circuit.

On the other hand, when the control valve unit 88 and all of the terminal valves 108a, 108b and 108c are closed, the pressure of the water confined in the pressure trapping circuit may happen to be unusually raised or lowered due to sudden reduction of the temperature of the water in the circuit and/or the temperatures of the various pipes and fittings constituting the pressure trapping circuit. When this occurs, especially when the water pressure in the pressure trapping circuit is reduced to an unusually low level, the flow detecting and checking means 88a and/or the differential pressure detecting means 88b in the control valve unit 88 may be brought into conditions to cause the burner actuator 80 and/or the water circulation pump 84 to start. To prevent such an accident, a pressure accumulator of a suitable type may be connected as temperature compensating means to the main hot-water supply passageway 96 as schematically indicated at 226 in FIG. 2 so as to take up an unusual change in the pressure of the water in the pressure trapping circuit. Incorporation of the pressure accumulator 226 will be conducive not only to compensating for the expansion or contraction of the water in the pressure trapping circuit but to prevention of the hunting or unusual start and stop of the water circulation pump 84 as caused by the instantaneous and temporary actuation of the second limit switch assembly 212 as above described.

By preference, an air-escape valve 228 and an automatic water feeder 230 may be provided at suitable locations in the piping arrangement to constitute the pressure trapping circuit as illustrated in FIG. 2, wherein the air-escape valve 228 is shown arranged in the radiator coil of the terminal heating unit 74b and the water feeder 230 is shown arranged to be connected to the radiator coil of the terminal heating unit 74c. The automatic water feeder 230 is installed for the purpose of vaporizing water fed from the radiator coil of the terminal heating unit 74c for humidifying the zone to be air conditioned by the terminal heating unit 74c. To enable these air-escape valve 228 and the automatic water feeder 230 to operate properly and for the purpose of maintaining under a positive static pressure the water which is confined in the pressure trapping circuit when the system is at rest, the motor-driven pump 84 may be provided with means (not shown) responsive to variation in the pressure of the water in the pressure trapping circuit and operative to automatically start the pump 84 when the pressure in the pressure trapping circuit is about to lower toward zero level and to shut off the pump 84 when the pressure in the circuit is increased to a certain positive level.

If desired, furthermore, the burner actuator 80 of the water heating unit 72 may be electrically connected to the a.c. power source 94 not only across the first limit switch assembly 210 but across a thermostat switch 232 (FIG. 2) which is sensitive to the temperature of the water in the boiler 76 so as to start and stop the fuel burner 78 not only depending upon the flow rate of water through the control valve unit 88 but depending upon the temperature of the water heated in the boiler 74.

The before-pump pressure compartment 148a of the differential pressure detecting means 88b has been described to be in communication with the suction port of the water circulation pump 84 but, if desired, may be open to the atmosphere if the compression spring 206 acting on the diaphragm element 188 of the means 88b is selected to have a force substantially equal to the force exerted on the diaphragm element 188 by the elevation head Ph produced by the expansion tank 136.

A second preferred embodiment of the central air-conditioning system according to the present invention will be hereinafter described with reference to FIGS. 8, 9 and 10. The second preferred embodiment is distinct over the embodiment of FIGS. 2 to 4 by the construction and arrangement of the control valve unit provided between hot-water delivery means and a hot-water supply circuit terminating in terminal heating units but is operative on basically the same principles as those on which the first embodiment. The control valve unit of the second embodiment is, therefore, assumed to be incorporated into a remote-controlled central air-conditioning or heating system including a water heating unit and terminal heating units which are arranged similarly to the water heating unit 72 and the terminal heating units 74a, 74b and 74c, respectively, of the air-conditioning system illustrated in FIG. 2, though not shown in the drawings.

Figure 8:
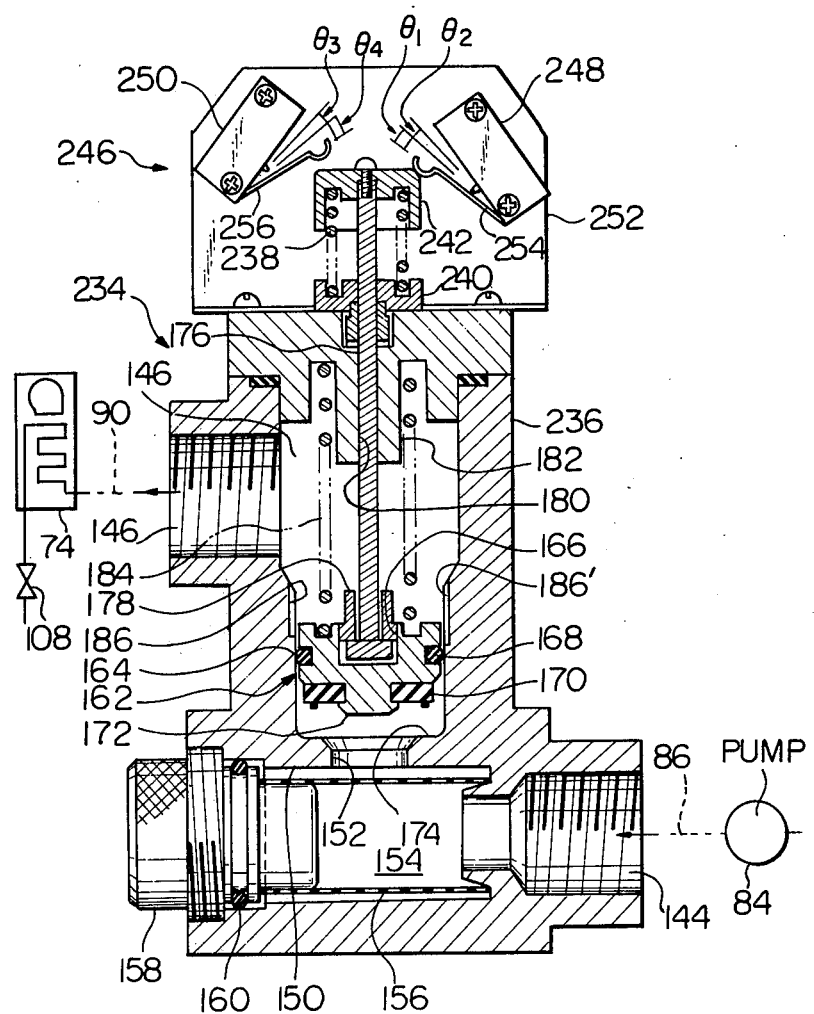
FIG. 8 is a sectional view showing the control valve unit forming part of a second preferred embodiment of the central air-conditioning system according to the present invention.

Referring to FIG. 8, the control valve unit, denoted in its entirety by reference numeral 234, of the second preferred embodiment of the air-conditioning system according to the present invention is, per se, constructed essentially similarly to the flow detecting and checking means 88a in the control valve unit 88 of the first embodiment and comprises a casing structure 236 formed with water inlet and outlet ports 142 and 144 which extend in directions substantially parallel with each other. The water inlet port 142 is in constant communication with the delivery port of a motor-driven water circulation pump 84 which has its suction port in constant communication with the hot-water outlet of the boiler forming part of the water heating unit of the second embodiment. Likewise, the water outlet port 144 of the control valve unit 234 is in constant communication with a hot-water supply circuit (not shown) which is composed of a main hot-water supply passageway and hot-water supply branch passageways branched from the main hot-water supply passageway through a flow distributing header and respectively terminating in the radiator coils of the individual terminal heating units. In FIG. 8, these terminal heating units are represented by a single terminal heating unit 74 for the purpose of illustration. The terminal heating units represented by this terminal heating unit 74 are communicable with the return-water inlet of the boiler through a water return circuit (not shown) which is composed of a main water return passageway terminating in the return-water inlet of the boiler and return-water branch passageways respectively leading from the radiator coils of the respective terminal heating units through terminal valves and jointly leading to the main return-water passageway through a flow distributing header, though not shown. The above mentioned terminal valves are represented in FIG. 8 by a single terminal valve 108.

The control valve unit 234 being essentially similar to the flow detecting and checking means 88a in the control valve unit 88 illustrated in FIG. 3, the casing structure 236 is further formed with a chamber 146 constantly open to the water outlet port 144, an opening 152 in an internal wall portion 150 of the casing structure 236, and an intermediate bore 154 providing constant communication between the water inlet port 142 and the opening 152 in the internal wall portion 150 of the casing structure 236. A tubular, perforated dust strainer 156 is shown mounted within the intermediate bore 154 and held in position by means of a threaded plug member 158 detachably screwed into the casing structure 236 with an annular sealing ring or gasket 160 interposed between the casing structure 236 and the plug member 158 as shown. A generally disc-shaped valve element 162 formed with an annular groove 164 in its outer peripheral wall portion and a recess 166 in its inner end wall portion is axially movable within the chamber 146 toward and away from the internal wall portion 150 of the casing structure 236 and has an annular sealing element 168 of a resilient material received in the annular groove 164. A resilient annular pad 170 is attached to the outer end face of the valve element 162 and is secured to the valve element 162 by means of an axial projection 172 formed on the outer end face of the valve element 162. The internal wall portion 150 of the casing structure 236 thus forms a valve seat 174 encircling the inner end of the opening 152 in the wall portion 150 so that the annular pad 170 on the valve element 162 is seated on the valve seat 174 when the valve element 162 is moved into the axial position closest to the internal wall portion 150.

An elongated valve stem 176 is fixedly connected at one end to a sleeve-shaped retaining member 178 which is fastened to the valve element 162 through the recess 166 in the valve element 162. The retaining member 178 and accordingly the valve stem 176 are slightly movable sidewise of the valve element 162 because of a small amount of allowance provided radially between the valve element 162 and the retaining member 178. The valve stem 176 axially projects out of the casing structure 236 through an elongated bore 180 formed in a wall portion of the casing structure 236, the wall portion forming an internal land 182 projecting into the chamber 146 toward the valve element 162 and thus constituting stop means for limiting the distance of movement of the valve element 162 away from the internal wall portion 150 of the casing structure 236. The valve element 162 is urged to axially move away from the internal land 182 by a preloaded helical compression spring 184 so that the valve element 162 is biased to move toward an axial position having the annular pad 170 seated on the valve seat 174 on the internal wall portion 150 of the casing structure 236 as illustrated in FIG. 8. Furthermore, the casing structure 236 has in its wall portion formed with the chamber 146 a pair of axial grooves 186 and 186' which are arranged similarly to their counterparts in the control valve unit 88 illustrated in FIG. 2 and partly in FIG. 4.

The valve element 162 and accordingly the valve stem 176 of the control valve unit 234 of the second embodiment are urged to axially move toward the valve seat 174 on the internal wall portion 150 of the casing structure 236 by suitable biasing means such as a preloaded helical compression spring 238 which is shown seated at one end on a stationary spring seat element 240 fixedly mounted on the casing structure 236 and a generally cup-shaped spring retainer element 242 which is fixedly carried by the valve stem 176 at the leading end of the outwardly projecting end portion of the valve stem 176. The compression springs 184 and 238 thus incorporated in the control valve unit 234 shown in FIG. 8 are selected in such a manner that the valve element 162 is enabled to assume a predetermined intermediate axial position spaced apart a predetermined distance $l_i$ (FIG. 10) from the valve seat 74 on the internal wall portion 150 of the casing structure 236 when the water pressures upstream and downstream of the valve element 162 are substantially equalized with each other.

Similarly to the embodiment of FIGS. 2 to 4, the second embodiment of the present invention further comprises electrical switching means 246 for controlling the motor-driven water circulation pump 84. The switching means 246 comprises first and second limit switch assemblies 248 and 250 which are mounted on a bracket 252 fixedly supported on the casing structure 236. The first and second limit switch assemblies 248 and 250 are constructed similarly to each other and have cantilevered actuating elements 254 and 256, respectively, each of which is rotatable about its own fulcrum point and which is located to be engageable with the spring retainer element 242 on the valve stem 176 when the valve stem 176 is moved axially outwardly through the casing structure 236. The first limit switch assembly 248 is constructed and arranged in such a manner as to be closed when the actuating element 254 thereof is pressed and turned about its fulcrum point away from the initial angular position of the element 254 through a first predetermined angle $\theta_1$ from the initial angular position and to be thereafter opened up when the actuating element 254 is turned back about the fulcrum point toward the initial angular position and reaches an angular position angularly spaced apart from the initial angular position through a second predetermined angle $\theta_2$ which is larger than the first predetermined angle $\theta_1$. On the other hand, the second limit switch assembly 250 is constructed and arranged to be closed when the actuating element 256 thereof is pressed and turned about its fulcrum point away from the initial angular position of the element 256 through a third predetermined angle $\theta_3$ from the initial angular position and to be thereafter opened up when the actuating element 256 is turned back about the fulcrum point of the element 256 toward the initial angular position thereof and reaches an angular position which is angularly spaced apart from the initial angular position through a fourth predetermined angle $\theta_4$ smaller than the third predetermined angle $\theta_3$. Each of the actuating elements 254 and 256 of the first and second limit switch assemblies 248 and 250 thus constructed and arranged is urged to turn about its fulcrum point toward the initial angular position thereof by suitable biasing means (not shown) incorporated in the switch assembly. The first limit switch assembly 248 is positioned with respect to the valve stem 176 in such a manner that the actuating element 254 thereof can be turned about its fulcrum point through the above mentioned first and second predetermined angles $\theta_2$ and $\theta_2$ from the initial angular position thereof when pressed upon by the spring retainer element 242 on the valve stem 176 which is moved with the valve element 162 over first and second predetermined distances $l_1$ and $l_2$ (FIG. 10) from its axial position having the annular pad 170 on the valve element 162 seated on the valve seat 174 on the internal wall portion 150 of the casing structure 236, the second predetermined distance $l_2$ being larger than the first predetermined distance $l_1$ and smaller than the distance $l_i$ of the valve element 162 in the previously mentioned intermediate axial position thereof within the chamber 146. Likewise, the second limit switch assembly 250 is positioned with respect to the valve stem 176 in such a manner that the actuating element 256 thereof can be turned about its fulcrum point through the above mentioned third and fourth predetermined angles $\theta_3$ and $\theta_4$ from the initial angular position of the actuating element 256 when pressed by the spring retainer element 242 on the valve stem 176 which is moved with the valve element 162 over third and fourth predetermined distances $l_3$ and $l_4$, respectively, (FIG. 10) from its axial position having the annular pad 170 on the valve element 162 seated on the valve seat 174 of the internal wall portion 150 of the casing structure 236. The fourth predetermined distance $l_4$ is smaller than the third predetermined distance $l_3$ but is larger than the second predetermined distance $l_i$ of the valve element 162 in the intermediate axial position thereof.

Figure 9:
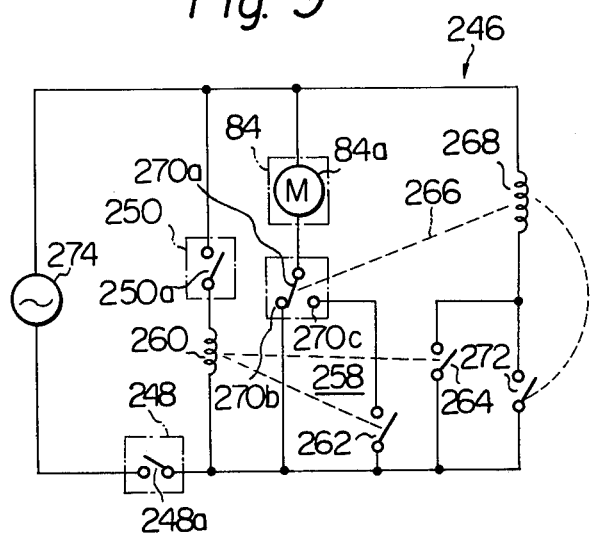
FIG. 9 is a schematic diagram showing a preferred example of an electric switching circuit for use with the control valve unit illustrated in FIG. 8.
Figure 10:
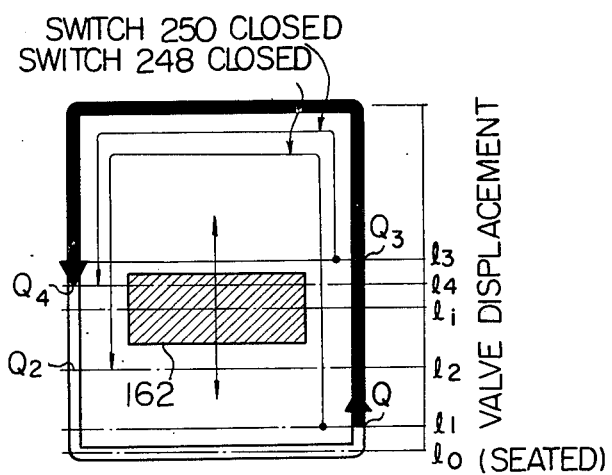
FIG. 10 is a diagram showing various axial positions of the valve element in the control valve unit illustrated in FIG. 8.

FIG. 9 shows a preferred example of the circuit arrangement of the switching means 246 incorporating the first and second limit switch assemblies 248 and 250 thus constructed and arranged. Referring to FIG. 9, the switching means comprises a first relay 258 consisting of a coil 260 and first and second normally-open contact sets 262 and 264 and a second relay 266 consisting of a coil 268, a two-position first contact set 270 and a normally-open second contact set 272, the two-position first contact set 270 of the second relay 266 having a movable contact 270a and first and second stationary contacts 270b and 270c between which the movable contact 270a is movable. The second relay 266 is such that the movable contact 270a thereof is normally connected to the first stationary contact 270b and is connected to the second stationary contact 270c when the relay coil 268 is energized. The above described first and second limit switch assemblies 248 and 250 include normally-open switch elements 248a and 250a, respectively, which are connected in series across an a.c. power source 274 through the coil 260 of the first relay 258. The coil 268 of the second relay 266 is connected to the a.c. power source across the switch element 248a of the first limit switch assembly 248 and across a parallel combination of the second contact set 264 of the first relay 258 and the second contact set 272 of the second relay 266. The motor, designated by 84a, of the water circulation pump 84 is connected to the a.c. power source 274 across the switch element 248a of the first limit switch assembly 248 and across the first contact set 270 of the second relay 266 wherein the first stationary contact 270b is directly connected to the switch element 248a and the second stationary contact 270c is connected to the switch element 248a across the first contact set 262 of the first relay 258.

Though not shown in the drawings, the embodiment of the air-conditioning system hereinbefore described with reference to FIGS. 8 and 9 further comprises differential flow detecting means and switch means to control the burner actuator of the water heating unit. Such means are herein assumed to be constructed and arranged similarly to their respective counterparts in the embodiment of FIGS. 2 to 4 and, as such, description will not be herein repeated regarding the construction and operation thereof.

The operation of the second preferred embodiment of the present invention thus constructed and arranged will be hereinafter described with reference to FIGS. 8 and 9 and further to FIG. 10 which diagrammatically shows various axial positions of the valve element 162 moved from its axial position having the annular pad 170 seated on the valve seat 174 on the internal wall portion 150 of the casing structure 236, such as axial position being indicated in FIG. 10 by $l_o$.

When, now, all of the terminal valves represented by the terminal valve 108 in FIG. 8 are held closed, a pressure trapping circuit is constituted from the water outlet port 144 of the control valve unit 234 to the individual terminal valves 108 so that the force exerted on the valve element 162 by the water pressure in the water outlet port 144 in the casing structure 236 overcomes the force exerted on the valve element 162 by the water pressure (which approximates the elevation head constantly established in the system) in the opening 152 in the internal wall portion 150 of the casing structure 236 with the water circulation pump 84 maintained at rest. The valve element 162 is thus held in the axial position having the annular pad 170 seated on the valve seat 174 on the internal wall portion 150 so that the valve stem 176 is disengaged from the actuating elements 254 and 256 of the first and second limit switch assemblies 248 and 250 and as a consequence the respective normally-open switch elements 248a and 250a of the switch assemblies 248 and 250 shown in FIG. 9 are kept open. Under these conditions, the control valve unit 234 serves as a one-way check valve preventing the flow of the water from the chamber 146 back to the water inlet port 142 through the opening 152 in the internal wall portion 150 of the casing structure 140.

If one of the terminal valves 108 is opened up under these conditions, the water which has been confined in the pressure trapping circuit is allowed into the water return circuit and causes sudden reduction in the water pressure in the hot-water supply circuit originating in the water outlet port 144 of the control valve unit 234. As the pressure of the water in the chamer 146 in the control valve unit 234 is reduced toward the level of the elevation head established in the system, the valve element 162 is axially moved from its initial position having the annular pad 170 seated on the valve seat 174 on the internal wall portion 150 of the casing structure 140 by the force of the compression spring 238 urging the valve stem 176 to project outwardly from the casing structure 140. When the valve element 162 thus moved reaches the axial position spaced apart the predetermined distance $l_1$ from its initial axial position having the pad 170 seated on the valve seat 174 on the internal wall portion 150 of the casing structure 140 as indicated at $Q_1$ in FIG. 10, the spring retainer element 242 on the valve stem 176 is brought into pressing engagement with the actuating element 254 of the first limit switch assembly 248. This causes the normally-open switch element 248a of the switch assembly 248 to close and make up a closed loop through the a.c. power source 274 and the motor 84a of the water circulation pump 84 because the movable contact 270a of the first contact set 270 of the second relay 266 is kept connected to the first stationary contact 270b with the relay coil 268 kept deenergized. The motor 84a of the water circulation pump 84 is now energized from the a.c. power source 274 and accordingly the water circulation pump 84 is initiated into motion to deliver water under pressure to the water inlet port 142 of the control valve unit 234. The force of the water pressure acting on the valve element 162 from the opening 152 in the internal wall portion 150 of the casing structure 140 of the valve unit 234 is thus gradually increased and urges the valve element 162 to further move away from the valve seat 174 on the internal wall portion 150. When the valve element 162 reaches a predetermined axial position from the valve seat 174 on the internal wall portion 150, the annular sealing element 168 on the valve element 162 is located on the axial grooves 186 and 186′ forming part of the chamber 146 in the casing structure 140 and allows water to pass from the opening 152 in the wall portion 150 to the water outlet port 144 through the opening 152 and the grooves 186 and 186′, thereby raising the water pressure in the chamber 146 toward the level of the water pressure developed in the water inlet port 142 of the control valve unit 234. The water delivered from the water circulation pump 84 is therefore allowed to flow through the control valve unit 234 at an increasing rate and as a consequence the valve element 162 is further moved away from the valve seat 174 on the internal wall portion 150 of the casing structure 140 beyond the intermediate axial position spaced apart the predetermined distance $l_i$ from the valve seat 174 on the internal wall portion 150. When the valve element 162 is thus axially moved the predetermined distance $l_3$ from the valve seat 174 as indicated at $Q_3$ in FIG. 10, the spring retainer element 242 on the valve stem 176 is brought into pressing engagement with the actuating element 256 of the second limit switch assembly 250 and causes the normally-open switch element 250a of the switch assembly 250 to close. When the switching element 250a is thus closed, the coil 260 of the first relay 258 in the circuit arrangement illustrated in FIG. 9 is energized from the a.c. power source 274 through the respective switch elements 248a and 250a of the first and second limit switch assemblies 248 and 250 and causes the first and second normally-open contact sets 262 and 264 of the relay 258 to close concurrently. The second contact set 264 of the first relay 258 being now closed, the coil 268 of the second relay 266 is energized from the a.c. power source 274 through the switch element 248a of the first limit switch assembly 248 and the second contact set 264 of the first relay 258 with the result that the first contact set 270 of the relay 266 is caused to have its movable contact 270a disconnected from the first stationary contact 270b and connected to the second stationary contact 270c and at the same time the normally-open contact set 272 of the relay 266 is caused to close. The motor 84a of the water circulation pump 84 which has been connected to the a.c. power source 274 through the first contact 270b of the first contact set 270 of the second relay 266 is now connected to the a.c. power source 274 through the second contact 270c of the first contact set 270 of the relay 266 and through the first contact set 262 of the first relay 258 and continues its operation to deliver hot water to the control valve unit 234.

If the terminal valve or valves 108 which have been held open is or are closed under these conditions, then the pressure of the water staying downstream of the control valve unit 234 is increased and as a consequence the valve element 162 is axially moved backwardly toward the valve seat 174 on the internal wall portion 150 of the casing structure 140. When the valve element 162 is thus moved back into the axial position which is spaced apart the predetermined distance $l_4$ from the valve seat 174 on the internal wall portion 150 as indicated at $Q_4$ in FIG. 10, the actuating element 256 of the second limit switch assembly 250 causes the switch element 250a of the switch unit 250 to open. The coil 260 of the first relay 258 is therefore disconnected from the a.c. power source 274 and allows the normally-open contact sets 262 and 264 of the relay 258 to resume their initial closed conditions. The coil 268 of the second relay 266 being kept energized from the a.c. power source 274 with the second contact set 272 of the relay kept closed, the movable contact 270a of the first contact set 270 of the second relay 266 stays on the second stationary contact 270c so that the motor 84a of the water circulation pump 84 is disconnected from the a.c. power source 274. The motor-driven water circulation pump 84 is now brought to a full stop and ceases delivery of hot water to the control valve unit 234. THe valve element 162 is therefore moved rapidly toward its initial position to have the annular pad 170 seated on the valve seat 174 on the internal wall portion 150 of the casing structure 140. When the valve element 162 thus reaches the axial position spaced apart from the valve seat 174 on the internal wall portion through the predetermined distance $l_2$ as indicated at $Q_2$ in FIG. 10, the actuating element 254 of the first limit switch assembly 248 causes the switch element 248a of the unit to open and disconnects the coil 268 of the second relay 266 from the a.c. power source 274. The movable contact 270a of the first contact set 270 of the relay 266 is thus returned to the first stationary contact 270b of the contact set 270 and at the same time the normally-open second contact set 272 of the relay 266 is allowed to close. The valve element 162 is thereafter moved into the initial axial position closing the opening 152 in the internal wall portion 150 of the casing structure 140 by the annular pad 170 on the valve element 162. The water circulation pump 84 is in these manners maintained operative while the valve element 162 is being moved from the axial position $Q_1$ toward the axial position $Q_3$ and further beyond the axial position $Q_3$ after the terminal valve 108 is opened up and thereafter backwardly through the axial position $Q_3$ to the axial position $Q_4$ as indicated by a thick line in FIG. 10 until the terminal valve 108 is closed.

The water inlet port 142 of the control valve 234 has been described to be in communication with the delivery port of the water circulation pump 84 but, if desired, may communicate with the suction port of the pump 84.

Figure 11:
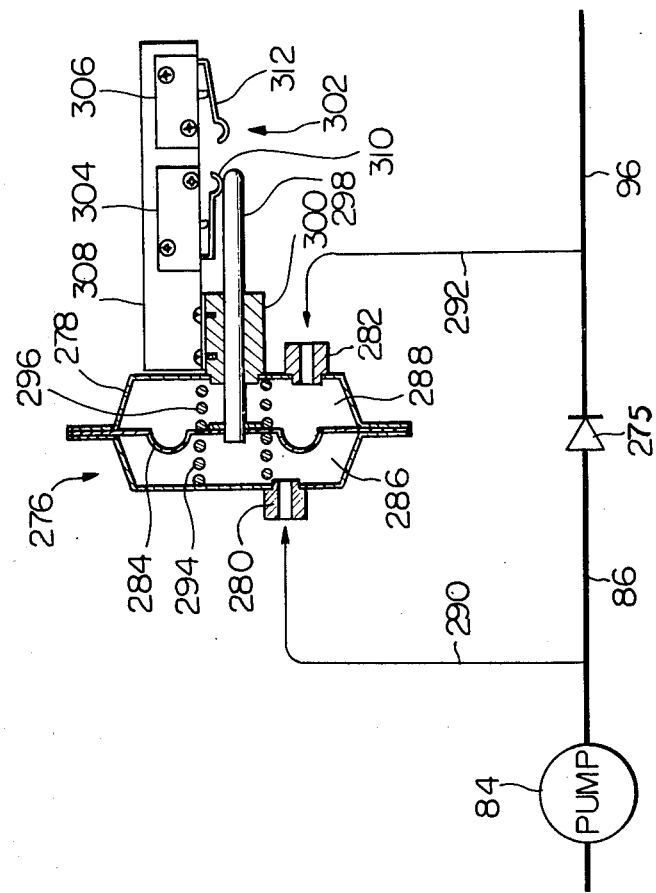
FIG. 11 is a schematic view showing, largely in cross section, control means forming part of a third preferred embodiment of the air-conditioning system according to the present invention.

FIG. 11 illustrates a pump control arrangement of a third preferred embodiment of the central air-conditioning system according to the present invention. The pump control arrangement herein shown depends for its operation on substantially the same principles on which the control valve unit illustrated in FIG. 8 operates. The system including the pump control arrangement shown in FIG. 11 is thus assumed, by way of example, to be constructed and arranged essentially similarly to the central air-conditioning system illustrated in FIG. 2 except for the particular pump control system.

Referring to FIG. 11, the pump control arrangement comprises a one-way check valve 275 having a water inlet end communicating with the delivery port of a motor-driven water circulation pump 84 through a hot-water discharge passageway 86 and a water outlet end communicating with a hot-water supply circuit including a main hot-water supply passageway 96. The one-way check valve 275 is shunted by a diaphragm assembly 276 having a hollow casing structure 278 comprising two water inlet fittings 280 and 282 on both end walls of the casing structure 278. A flexible diaphragm element 284 is secrued at its entire outer peripheral end to the inner wall of the casing structure 278 and divides the internal space of the casing structure 278 into complementarily expansible and contractable first and second variable-volume chambers 286 and 288. The first variable-volume chamber 286 is in constant communication with the hot-water discharge passageway 86 and accordingly with the delivery port of the water circulation pump 84 through the water inlet port 280 and a passageway 290. Likewise, the second variable-volume chamber 288 is in constant communication with the main hot-water supply circuit 90 through the water inlet fitting 282 and a passageway 292. The diaphragm element 284 is urged to assume a predetermined intermediate position within the casing structure 278 by suitable biasing means such as a pair of preloaded helical compression springs 294 and 296 which are positioned within the first and second variable-volume chambers 286 and 288, respectively, and which are seated on the opposite faces of the diaphragm element 284. An elongated plunger rod 298 is connected at one end to the diaphragm element 284 and axially projects substantially perpendicularly to the diaphragm element 284 out of the casing structure 278 through the second variable-volume chamber 288 and slidably through an elongated bore in a guide member 300 which is fixedly mounted on the casing structure 278.

The pump control arrangement shown in FIG. 11 further comprises switching means 302 including first and second limit switch assemblies 304 and 306 which are mounted on a bracket 308 secured to the guide member 300 as shown and which have actuating elements 310 and 312, respectively, each of which is urged by suitable biasing means (not shown) to hold each switch assembly open and is adapted to close the switch assembly when pressed upon. The switch assemblies are positioned with respect to the plunger rod 298 in such a manner that the plunger rod 298 is brought into pressing engagement first with the actuating element 310 of the first limit switch assembly 304 and thereafter with the actuating element 312 of the second limit switch assembly 306 when the plunger rod 298 is moved forwardly, viz., in a direction to protrude outwardly from the casing structure 278 from its axial position assumed by the plunger rod 298 when the diaphragm element 284 is in a position producing a minimum volume in the first variable-volume chamber 286. The particular axial position of the plunger rod 298 is herein referred to as first extreme axial position of the plunger rod. Though not shown, the first and second limit switch assemblies 304 and 306 thus arranged have respective normally-open switch elements which are connected across an a.c. power source in a manner similar to the switch elements 248a and 250a of the limit switch assemblies 248 and 250, respectively, in the circuit arrangement illustrated in FIG. 9. Operation of the pump control arrangement shown in FIG. 11 will therefore be hereinafter described with reference to FIGS. 9 and 11.

When all of the terminal valves (not shown) of the system incorporating the pump control arrangement shown in FIG. 11 are held closed, a pressure trapping circuit is constituted from the water outlet end of the one-way check valve 275 and the individual terminal valves so that the force exerted on the diaphragm element 284 by the pressure or the elevation head established in the first variable volume chamber 286 of the diaphragm assembly 276 is overcome by the opposing force resulting from the water pressure acting on the diaphragm element 284 from the second variable-volume chamber 288. The diaphragm element 284 is therefore maintained in the position producing the minimum volume in the first variable-volume chamber 286 and thus holds the plunger rod 298 in the first extreme axial position thereof. The plunger rod 298 is thus kept disengaged from the actuating elements 310 and 312 of both of the first and second limit switch assemblies 304 and 306. Under these conditions, the motor 84a of the water circulation pump 84 shown in FIG. 9 is disconnected from the a.c. power source 274 and remains inoperative, maintaining the a water pressure at a level substantially equal to the elevation head prevailing in the system.

If one of the terminal valves is then opened up, the water which has been confined in the pressure trapping circuit downstream of the one-way check valve 275 is allowed into the water return circuit (not shown) of the system and causes sudden reduction in the water pressure in the hot-water supply circuit originating in the water outlet end of the one way check valve 275. As the pressure of the water in the second variable-volume chamber 288 of the diaphragm assembly 276 is thus reduced toward the level of the elevation head established in the first variable-volume chamber 286, the diaphragm element 284 is moved or deformed in a direction to expand the first variable-volume chamber 286 from its initial position by the force of the compression spring 294 urging the diaphragm element 284 toward the previously mentioned predetermined intermediate postion within the casing structure 278, thereby causing the plunger rod 298 to forwardly move from the first extreme axial position thereof. When the plunger rod 298 is thus moved over the first predetermined distance from the first extreme axial position, the plunger rod 298 is brought into pressing engagement with the actuating element 310 of the first limit switch assembly 304, which is therefore caused to have its nomrally-open contact closed by the actuating element 310. The motor 84a of the water circulation pump 84 is now energized from the a.c. power source 274 through the switch element of the first limit switch assembly 304 and through the first stationary contact 270b of the first contact set 270 of the relay 258 in the circuit arrangement shown in FIG. 9. The motor-driven water circulation pump 84 is thus initiated into motion to deliver water to the hot-water discharge passageway 86 and through the passageway 86 and the one-way check valve 275 to the hot-water supply circuit of the system. The water pressure in the first variable-volume chamber 286 of the diamphragm assembly 276 is consequently raised from the level of the elevation head and urges the diaphragm element 284 to further move in the direction to expand the first variable-volume chamber 286 against the force of the compression spring 296 in the second variable-volume chamber 288, thereby causing the plunger rod 298 to further move forwardly a distance longer than the first predetermined distance from the initial first extreme axial position of the plunger rod 298. As the water pressure in the first variable-volume chamber 286 is further increased and accordingly the plunger rod 298 is further moved forwardly, the plunger rod 298 is brought into pressing engagement with the actuating element 312 of the second limit switch assembly 306, which is accordingly caused to have its normally-open switch element closed by the actuating element 312. The coil 260 of the first relay 258 is therefore energized from the a.c. power source 274 and causes the first and second normally-open conact sets 262 and 264 of the relay 258 to close concurrently, making up a closed loop from the a.c. power source 274 to the coil 268 of the second relay 266 through the second contact set 264 of the first relay 258. This causes the movable contact 270a of the first contact set 270 of the relay 266 to shift from the first stationary contact 270b to the second stationary contact 270c of the contact set 270 with the result that the motor 84a of the water circulation pump 84 is energized from the a.c. power source 274 through the second stationary contact 270c of the contact set 270 of the second relay 266 and through the first contact set 262 of the first relay 258. The plunger rod 296 is further moved forwardly toward a second extreme position which is reached by the plunger rod 298 when the first variable-volume chamber 286 is fully expanded to produce a maximum volume therein.

When the terminal valve which has been open is closed under these conditions, the pressure trapping circuit is produced between the one-way check valve 275 and the individual terminal valves including the terminal valve thus closed from an open condition. The pressure of the water in the second variable-volume chamber 288 of the diaphragm assembly 276 is now increased abruptly and as a consequence the force of the pressure acting on the diaphragm element 284 from the second variable-volume chamber 288 overcomes the opposing force exerted on the diaphragm element 284 by the pressure of the water being pumped from the water circulation pump, viz., the water pressure in the first variable-volume chamber 286 of the diaphragm assembly 276. This causes the diaphragm element 284 to move or deform backwardly, viz., in a direction to contract the first variable-volume chamber 286 so that the plunger rod 298 is axially moved back in a direction to retract into the casing structure 278. When the plunger rod 298 is thus disengaged from the actuating element 312 of the second limit switch assembly 306, the normally-open switch element of the switch assembly 306 is allowed to open. The coil 260 of the first relay 258 is therefore de-energized and allows the first and second normally-open contact sets 262 and 264 to open. The coil 268 of the second relay 266 remaining energized from the a.c. power source 274 with the associated second contact set 272 of the relay 266 kept closed, the movable contact 270a of the first contact set 270 of the relay 266 stays on the second stationary contact 270c so that the motor 84a of the water circulation pump 84 shown in FIG. 9 is disconnected from the power source 274. The motor-driven water circulation pump 84 is thus brought to a full stop and ceases delivery of hot water to the pressure trapping circuit. The water pressure in the first variable-volume chamber 286 of the diaphragm assembly 276 is reduced abruptly and accordingly the diaphragm element 284 is moved back toward its initial position producing the minimum volume in the first variable-volume chamber 286, causing the plunger rod 298 to resume its initial first extreme axial position. Immediately before the plunger rod 298 thus reaches the first extreme axial position thereof, the plunger rod 298 is disengaged from the actuating element 310 of the first limit switch assembly 304 so that the normally-open switch element of the switch assembly 304 is allowed to open. In the circuit arrangement of FIG. 9, this causes the coil 268 of the second relay 266 to be disconnected from the power source 274 and allows the movable contact 270a of the first contact set 270 of the relay 266 to shift back from the second stationary contact 270c to the first stationary contact 270b and the second contact set 272 to open.

If desired, the first and second limit switch assemblies 304 and 306 may be replaced with switch means similar to the first and second limit switch assemblies 248 and 250, respectively, in the arrangement illustrated in FIG. 8 so that each of such switch means is closed and opened up when the plunger rod 298 moved forwardly and thereafter backwardly reaches different positions from the initial extreme axial position. It is apparent that, conversely, the first and second limit switch assemblies 248 and 250 of the arrangement illustrated in FIG. 8 may be replaced with the first and second limit switch assemblies 304 and 306, respectively, in the arrangement of FIG. 11.

Figure 12:
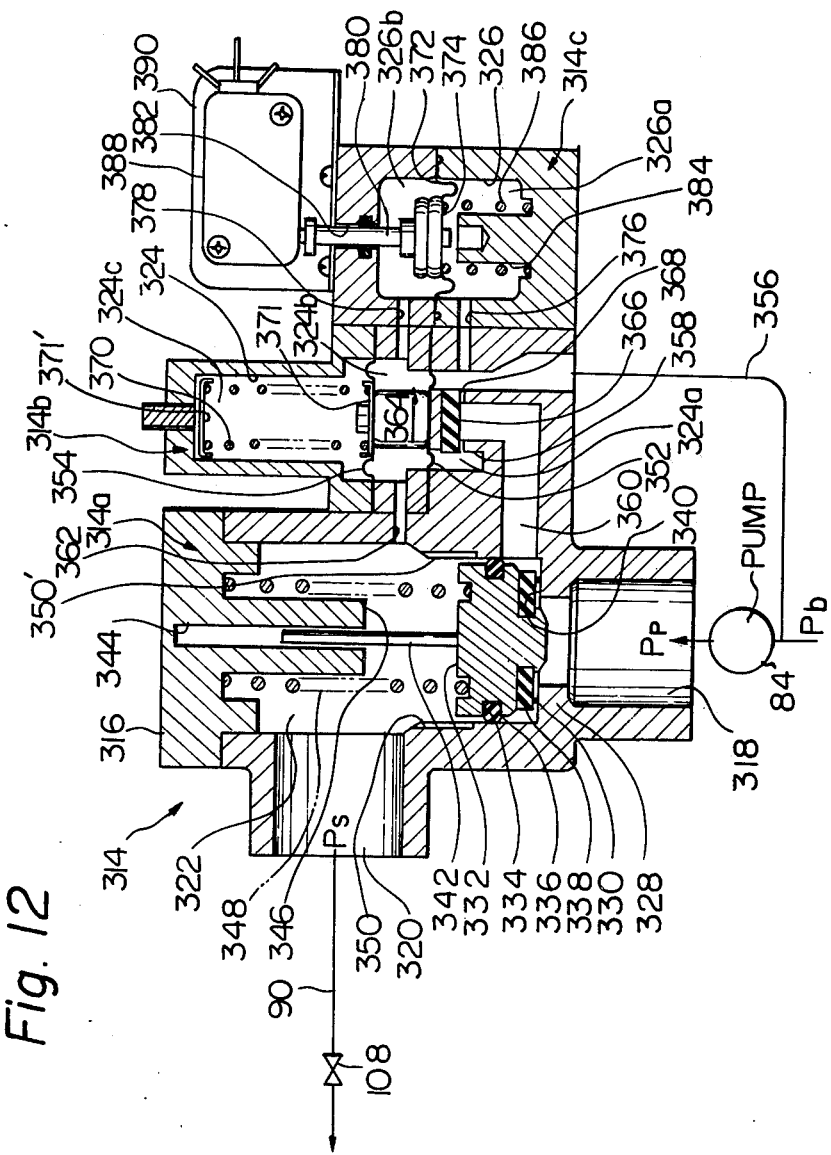
FIG. 12 is a sectional view showing the control valve unit forming part of a fourth preferred embodiment of the central air-conditioning system according to the present invention.

FIG. 12 illustrates a control valve unit forming part of a fourth preferred embodiment of the central air-conditioning system according to the present invention. The air-conditioning system incorporating the control valve unit herein shown is also assumed, by way of example, to be constructed and arranged similarly to the system shown in FIG. 2 except for the control valve unit per se. The terminal valves associated with the terminal heating unit of the system including the control valve unit shown in FIG. 12 is are represented by a single terminal valve 108.

The control valve unit, designated in its entirety by reference numeral 314, comprises a casing structure 316 which is formed with a water inlet port 318 which is in communication with the delivery port of a motor-driven water circulation pump 84 and a water outlet port 320 which is in communcation with a hot-water supply circuit which is diagrammatically represented by a single line 90 terminating in the terminal valve 108 which is representative of the individual terminal valves incorporated into the system. The control valve unit 314 as a whole is constructed to have provided therein flow detecting and checking means 314a, feedback valve means 314b and differential pressure detecting means 314c, the means 314a, 314b and 314c being juxtaposed arranged in parallel, with the feedback valve means 314b located between the flow detecting and checking means 314a and the differential pressure detecting means 314c. The casing structure 316 is thus formed with first, second and third cavities or chambers 322, 324 and 326 for accommodating therein the above mentioned means 314a, 314b and 314c, respectively, the individual chambers 322, 324 and 326 being elongated in directions which are substantially parallel with each other as shown.

The casing structure 316 has at one longitudinal end of the first chamber 322 an internal wall portion 328 which is formed with an opening 330 for providing communication between the water inlet port 318 and the first chamber 322. The above mentioned flow detecting and checking means 314a is constructed and arranged largely similarly to the flow detecting and checking means 88a in the control valve unit 88 of the embodiment illustrated in FIGS. 2 to 4 and thus comprises a valve element 332 which is axially movable within the first chamber 322 toward and away from the internal wall portion 328 of the casing structure 316. The valve element 332 is formed with an annular groove 334 in its outer peripheral wall portion and has received in the groove 334 an annular sealing element 336 of a suitable resilient material. An annular pad 338 also formed of a suitable resilient material is attached to the outer end face of the valve element 332 which has an axial projection holding the annular pad 338 in position on the valve element. The annular pad 338 is seated on the inner face of the internal wall portion 328 when the valve element 332 is moved into the axial position closest to the wall portion 328 as shown in FIG. 12. The internal wall portion 328 of the casing structure 316 thus forms a valve seat 340 on its inner face defining one longitudinal end of the first chamber 322 and around the inner axial end of the opening 330 in the wall portion 328.

An elongated valve stem 342 is fixedly connected at one end to the valve element 332 and axially extends in a direction opposite to the opening 330 in the internal wall portion 328, having its leading end portion slidably received in an elongated bore 344 which is formed in a guide wall portion of the casing structure 316. The guide wall portion of the casing structure 316 forms in part an internal land 346 projecting into the chamber 322 toward the valve element 332 and constitutes stop means for limiting the axial movement of the valve element 332 away from the valve seat 340 on the internal wall portion 328 of the casing structure 316. The valve element 332 is urged to axially move toward the valve seat 340, viz., toward the axial position to close the opening 330 in the internal wall portion 328 by the annular pad 338 thereon by suitable biasing means such as a preloaded helical compression spring 348 which is positioned substantially in parallel with the valve stem 342 and which is seated at one end on the inner end face of the valve element 332 and at the other end in an annular groove formed in the casing structure 316 around a base portion of the internal land 346 as shown.

The casing structure 316 further has a suitable number of axial grooves formed in its wall portion formed with the first chamber 322 and in proximity to the valve seat 340 on the internal wall portion 328, the grooves being herein assumed by way of example as two in number as indicated by 350 and 350'. These axial grooves 350 and 350' are arranged similarly to the axial grooves 186 and 186' in the casing structure 140 of the embodiment illustrated in FIGS. 2 to 4, particularly, in FIGS. 2 and 3 and, thus, each of the grooves 350 and 350' is elongated substantially in parallel with the direction of axial movement of the valve element 332 and has one end axially open to the chamber 322 in a direction opposite to the valve seat 340 on the internal wall portion 328 and the other end axially closed and located at a predetermined distance from the valve seat 174. As in the case of the embodiment of FIGS. 2 to 4, the number of the axial grooves to be thus formed in the casing structure 316 and/or the cross sectional area of each of the grooves are selected in such a manner as to provide a desired flow rate of water through the grooves when the valve element 332 is in an axial position having the annular sealing element 336 located on the grooves. The grooves 350 and 350' are herein assumed, by way of example, to be located substantially in diametrically opposed relationship to each other as in the case of the axial grooves 186 and 186' shown in FIG. 2 but, if desired, they may be located in cross section in an desired manner with respect to the valve element 332 provided the grooves are axially sized and located in the above described relationship to the axial movement of the valve element 332 within the chamber 322.

On the other hand, the second chamber 324 to accommodate the feedback valve means 314b therein comprises flexible first and second flexible diaphragm elements 352 and 354 which are secured along thier respective outer peripheral end portions to an internal wall portion of the casing structure 316 and which are spaced apart generally in parallel from each other, dividing the second chamber 324 into separate first, second and third variable-volume compartments 324a, 324b and 324c which are arranged in series with the second variable-volume compartment 324b located between the first and third variable-volume compartments 324a and 324c as shown. The first variable-volume compartment 324a is in constant communication with the suction port of the water circulation pump 84, viz., with a hot-water delivery passageway 82 between the hot-water outlet of a boiler (not shown) and the suction port of the pump 84 through a water feedback passageway 356. The casing structure 316 has on its wall portion formed with the first variable-volume compartment 324a an internal land 358 axially projecting into the compartment 324a toward the first diaphragm element 352. The casing structure 316 is further formed with a passageway 360 which is open at one end to the first chamber 322 in proximity to the valve seat 340 on the internal wall portion 328 of the casing structure 316 and at the other end to the first variable-volume compartment 324a in the second chamber 324 through the land 358 as shown. The second variable-volume compartment 324b in the second chamber 324 is in constant communication with the first chamber 322 through a passageway 362 so that the water pressure developed in the first chamber 322 is constantly directed into the second variable-volume compartment 324b through the passageway 362. The third variable-volume compartment 324c is isolated from any portion of the passageway of the water in the system and may be open to the atmosphere through a suitable breather port (not shown).

The first and second diaphragm elements 352 and 354 are securely connected together by a rigid connecting member 364 and are thus movable as a single unit within the chamber 324. Furthermore, the first diaphragm element 352 has mounted on its outer face defining the first variable-volume compartment 324a a valve element 366 which is axially movable into and out of a position seated on the leading end of the internal land 358 forming part of the casing structure 316 and projecting into the compartment 324a. The internal land 358 forming part of the passageway 360 terminating in the first variable-volume compartment 324a forms a valve seat 368 on its leading end. The valve element 366 is urged to axially move toward the position seated on the valve seat 368 on the internal land 358 and thus closing the passageway 360 at the end of the internal land 358 by suitable biasing means such as a preloaded helical compression spring 370 which is positioned within the third variable-volume compartment 324c and which is seated at one end on a spring retaining element 371 mounted on the outer face of the second diaphragm element 354 and at the other end on a spring retaining element 371' which is received on the inner face of a wall portion of the casing structure at the opposite end of the third variable-volume compartment 324c to the second diaphragm element 354.

The second chamber 324 thus accommodating the feedback valve means 314b is shaped in such a manner that the second variable-volume compartment 324b therein has different cross sectional areas which are smaller in the vicinity of the first diaphragm element 352 and larger in the vicinity of the second diaphragm element 354 so that the first diaphragm element 352 is exposed over a smaller area than the second diaphragm element 354. By virtue of such a configuration of the second variable-volume compartment 324b in the second chamber 324, the water pressure developed in the second variable-volume compartment 324b produces a greater force on the second diaphragm element 354 than on the first diaphragm element 352 and as a consequence exerts a variable biasing force on the valve element 366 against the force of the comparession spring 370.

The differential pressure detecting means 314c accommodated within the third chamber 326 in the casing structure 316 is constructed and arranged essentially similarly to the differential pressure detecting means 88b in the embodiment of FIGS. 2 to 4 and, thus, comprises a flexible diaphragm element 372 which is securely fastened at its outer peripheral end portion to an internal wall portion of the casing structure 316 and which has a disc member 374 mounted on its center portion. The diaphragm element 372 and the disc member 374 thus divide the third chamber 326 into separate first and second variable-volume compartments 326a and 326b which are complementarily expansible and contractable depending upon the relative axial position of the diaphragm element 372 within the chamber 326. The first variable-volume compartment 326a in the third chamber 326 is in constant communication with the first variable-volume compartment 324a in the second chamber 324 through a passageway 376 formed in the casing structure 316, while the second variable-volume compartment 326b in the third chamber 326 is in constant communication with the second variable-volume compartment 326b in the second chamber 324 through a passageway 378 which is also formed in the casing structure 316. An elongated plunger rod 380 is connected at one end to the disc member 374 and axially extends throughout the second variable-volume compartment 326b. The plunger rod 380 axially movably extends through a bore 382 formed in a wall portion of the casing structure 316 and projects out of the casing structure. The casing structure 316 further has a wall portion internally formed with a land 384 axially projecting into the first variable-volume compartment 326a toward the diaphragm element 372. The internal land 384 thus forming part of the casing structure 316 serves as stop means for limiting the distance of axial movement of the diaphragm element 372 in a direction to contract the first variable-volume compartment 326a. The diaphragm element 372 and accordingly the plunger rod 380 are urged to axially move in the opposite direction, viz., in a direction to expand the first variable-volume compartment 326a by suitable biasing means such as a helical compression spring 386 which is positioned within the first variable-volume compartment 326a and which is seated at one end on one face of the disc member 374 on the diaphragm element 372 and at the other end on an internal face of the casing structure around a base portion of the internal land 384 of the casing structure 316.

A limit switch assembly 388 is mounted on a bracket 390 supported on the casing structure 316. Though not shown, the limit switch assembly 388 has built therein a normally-open switch element and an actuating element adapted to close the switch element when depressed. The switch assembly 388 is positioned with respect to the plunger rod 380 in such a manner that the plunger rod 380 is brought in pressuring engagement with the actuating element of the switch assembly 388 when the plunger rod 380 is axially moved in a direction to protrude outwardly from the casing structure 316 over a predetermined distance from an axial position in which the disc member 374 on the diaphragm element 372 is seated on the land 384. The switch element of the limit switch assembly 388 thus arranged is electrically connected between the motor (not shown) of the water circulation pump 84 and a suitable a.c. power source (not shown). The limit switch assembly 388 forms part of the switching means in the embodiment including the control valve unit 314 shown in FIG. 12. Such switching means further comprises a switch assembly adapted to be actuated by the flow detecting and checking means 314a and to start and shut off the burner actuator for the fuel burner of the boiler depending upon the operational conditions of the flow detecting and checking means 314a, though not shown in the drawings.

When, now, all the terminal valves which are represented in FIG. 12 by the single terminal valve 108 are kept closed, a pressure trapping circuit is constituted from the water outlet port 320 of the control valve unit 314 to the individual terminal valves 108. The pressure Ps of the water confined in the pressure trapping circuit is therefore maintained at a substantially constant, elevated level $P_1$ and holds the valve element 332 of the flow detecting and checking means 314a in the axial position having the annular pad 338 seated on the valve seat 368 on the internal wall portion 328 of the casing structure 316, thereby isolating the water inlet port 318 of the control valve unit 314 from the first chamber 322 in the casing structure 316 and from the passageway 360 having one end open in proximity to the valve seat 368. Under these conditions, the pressure Pb of the water staying in the respective first variable-volume compartments 324a and 326a of the feedback valve and differential pressure detecting means 314b and 314c is maintained at a level which is substantially equal to the elavation head Ph of the water in the system, while the pressure Ps of the water staying in the respective second variable-volume compartments 324b and 326b of the feedback valve and differential pressure detecting means 314b and 314c is maintained at the above mentioned elevated level $P_1$. The valve element 366 of the feedback valve means 314b is thus held in a certain equilibrium position which is assumed when the sum of the force exerted on the first diaphragm element 352 by the water pressure Pb (which is substantially equal to the elevation head Ph) in the first variable-volume compartment 324a and the differential force exerted on the first and second diaphragm elements 352 and 354 by the water pressure in the second variable-volume compartment 324b and the opposing force of the compression spring 370 acting on the second diaphragm element 354. In the differential pressure detecting means 314c, the sum of the force exerted on the diaphragm element 372 by the water pressure Pb in the first variable-volume compartment 326a and the force of the compression spring 386 is overcome by the opposing force exerted on the diaphragm element 372 by the water pressure Ps in the second variable-volume compartment 326b. The diaphragm element 372 is therefore moved or deformed in the direction to contract the first variable-volume chamber 326a and has the disc member 374 seated on the leading end of the internal land 384 projecting into the compartment 326a so that the plunger rod 380 is held in the axial position retracted a maximum distance into the casing structure 316 and is thus disengaged from the actuating element (not shown) of the limit switch assembly 388. The motor-driven pump 84 is therefore kept disconnected from the power source and is maintained at rest.

If one of the terminal valves 108 is opened up under these conditions, there is caused a sudden drop in the water pressure Ps in the hot-water supply circuit 90 and accordingly in each of the chamber 322 of the flow detecting and checking means 314a and the respective second variable-volume compartments 324b and 326b of the feedback valve and differential pressure detecting means 314b and 314c in the control valve unit 314. As a consequence, the force exerted on the diaphragm 372 of the differential pressure detecting means 314c by the water pressure Ps in the second variable-volume compartment 326b is overcome by the sum of the force of the compression spring 386 and the force exerted on the diaphragm element 372 by the water pressure Pb or Ph in the first variable-volume compartment 326a so that the diaphragm element 372 is allowed to move in the direction to expand the first variable-volume compartment 326a by the force of the compression spring 386 and accordingly the plunger rod 380 connected to the disc member 374 on the diaphragm element 372 is axially moved in the direction to project outwardly from the casing structure 316. When the pressure Ps of the water in the second variable-volume compartment 326b is reduced to a predetermined level $P_2$ (see FIG. 13) which is higher a predetermined value than water pressure Pb or Ph established in the first variable-volume compartment 326a, the plunger rod 380 reaches an axial position in pressing engagement with the actuating element of the limit switch assembly 388, which is accordingly caused to have its switch element closed. The motor-driven water circulation pump 84 is now put into operation to deliver water to the control valve unit 314 through the hot-water discharge passageway 90 leading to the water inlet port 318 of the valve unit 314. The increased water pressure Pp thus developed in the water inlet port 318 acts on the valve element 332 of the flow detecting and checking means 314a in the control valve unit 314 and moves the valve element 332 away from the valve seat 368 on the internal wall portion 328 of the casing structure 316, causing the annular pad 338 on the valve element 332 to be unseated from the valve seat 368 and thereby providing restricted communication between the water inlet port 318 and the passageway 360 leading to the first variable-volume compartment 324a of the feedback valve means 314b. The pressure Pp of the water thus admitted into the passageway 360 in the casing structure 316 acts on the valve element 366 and the first diaphragm element 352 of the feedback valve means 314b and causes the diaphragm element 352 to move together with the second diaphragm element 354, connecting member 364 and valve element 366 in a direction to expand the first variable-volume compartment 324a so that the valve element 366 is positioned over the valve seat 368 of the land 358 projecting into the compartment 324a, thereby establishing communication between the passageway 360 and the water feedback passageway 356 through the variable-volume compartment 324a. The water delivered to the water inlet port 318 of the control valve unit 314 is therefore fed back to the suction port of the water circulation pump 84 throgh the passageway 360 in the casing structure 316, the first variable-volume compartment 324a of the feedback valve means 314b and the water feedback passageway 356 as long as the valve element 332 of the flow detecting and checking means 314a is being axially moved away from the valve seat 340 on the internal wall portion 328 of the casing structure 316 toward the axial grooves 350 and 350' in the casing structure 316.

When the valve element 332 of the flow detecting and checking means 314a in the control valve unit 314 reaches an axial position having the sealing element 336 located on the axial grooves 350 and 350' forming part of the chamber 322 in the casing structure 316, the water in the water inlet port 318 of the control valve unit 314 is admitted not only into the first variable-volume compartment 324a of the feedback valve means 314b but into the chamber 322 of the flow detecting and checking means 314a through the grooves 350 and 350' at a rate which gradually increases as the valve element 332 is axially moved away from the valve seat 368 on the internal wall portion 328. When the flow rate of the water passed from the water inlet port 318 into the chamber 322 through the grooves 350 and 350' reaches a predetermined value $F_1$ developing a predetermined water pressure $P_3$ in the chamber 322 and accordingly in the hot-water supply circuit 90, the valve element 332 reaches an axial position having the annular sealing element 336 moved past the open axial ends of the grooves 350 and 350' in the casing structure 316. As the flow rate of the water passed from the water inlet port 318 to the water outlet port 320 increases beyond the predetermined value $F_1$, the water in the water inlet port 318 is passed to the passageway 360 leading to the first variable-volume compartment 324a of the feedback valve means 314b at a rate which is gradually reduced. The pressure Ps of the hot water downstream of the valve element 332 is, for this reason, maintained at a substantially fixed level slightly lower than the above mentioned predetermined level $P_3$ as indicated by curve s, particularly, a line segment $C_1-C_2$ forming part of the curve s shown in FIG. 13 which demonstrates the relationship between the flow rate of water past the valve element 332 in the control valve unit 314 and the pressure of the water downstream of the valve element 332. If other terminal valves are thereafter opened up in succession and the flow rate of the water through the control valve unit 314 to the hot-water supply passageway 96 reaches a predetermined value $F_2$ as at point $C_2$ on curve s shown in FIG. 13, the pressure Ps of the water in the hot-water supply circuit 90 is reduced to a predetermined level $P_4$ lower than the above mentioned predetermined level $P_3$ and thereafter droops as the flow rate of water increases as will be seen from the curve s. When the pressure Ps of the water being circulated through the hot-water supply circuit 90 is thus reduced below the predetermined level $P_4$, the differential force exerted on the first and second diaphragm elements 352 and 354 of the feedback valve means 314b by the water pressure Ps in the second variable-volume compartment 324b of the means 314b is overcome by the opposing force of the compression spring 370 so that the valve element 366 mounted on the first diaphragm element 352 is moved into the axial position seated on the valve seat face 368 of the land 358 projecting into the first variable-volume compartment 324a of the feedback valve means 314b and closes the passageway 360 at the leading end of the land 358. The hot water entering the water inlet port 318 is now totally passed to the chamber 322 of the flow detecting and checking means 314a in the control valve unit 314. Indicated by curve t in broken line in FIG. 13 is the relationship between the flow rate and the pressure of water in the hot-water supply circuit 90 as would be obtained if the water delivered from the water circulation pump 84 is totally passed to the hot-water supply circuit 90 or, in other words, the water entering the water inlet port 318 were not fed back to the suction port of the pump 84 through the passageway 360.

When the terminal valves 108 which have thus been opened up are closed in succession, the flow rate of water through the hot-water circuit 90 is reduced and at the same time the pressure of the water in the circuit is increased until the flow rate of the water reaches the above mentioned predetermined value $F_2$. The water pressure in the hot-water supply circuit 90 is maintained in the vicinity of the predetermined level $P_3$ as the flow rate of water through the circuit is reduced beyond the predetermined value $F_2$. While the last one of the terminal valves 108 is being closed and as a consequence the pressure Ps of the water in the hot-water supply circuit 90 is being increased to the predetermined level $P_4$, the differential force exerted on the first and second diaphragm elements 352 and 354 of the feedback valve means 314b by the water pressure Ps or $P_4$ developed in the second variable-volume compartment 324b of the means overcomes the opposing force of the compression spring 370 acting on the second diaphragm element 354 and moves the valve element 366 away from the valve seat face 368 of the internal land 358 of the casing structure 316, providing water communication between the passageway 360 and the first variable-volume compartment 324a of the feedback valve means 314b for a second time. The water delivered to the water inlet port 318 of the control valve unit 314 is therefore passed partially to the chamber 322 of the flow detecting and checking means 314a and partially to the first variable compartment 324a of the feedback valve means 314b and through the compartment 324a and the water feedback passageway 356 to the suction port of the water circulation pump 84. The water pressure Ps in the hot-water circuit 90 is thus maintained at a substantially fixed level between the predetermined values $P_3$ and $P_4$ and the flow rate of water fed back to the suction port of the water circulation pump 84 through the passageway 360 and the first variable-volume compartment 324a of the feedback valve means 314b gradually increases as the flow rate of water through the circuit 90 is reduced toward the previously mentioned predetermined value $F_1$. When the last terminal valve 108 is on the point of being fully closed and as a consequence the flow rate of the water through the hot-water supply circuit 90 reaches the predetermined value $F_1$, the valve element 332 of the flow detecting and checking means 314a is axially moved toward the valve seat 368 of the internal wall portion 328 of the casing structure 316 and reaches an axial position having the annular sealing element 336 located to be sidewise contiguous to the axial grooves 350 and 350' in the casing structure 316 so that the water entering the water inlet port 318 of the control valve unit 314 is allowed into the chamber 322 at a restricted rate causing the water pressure Ps in the chamber 322 to further rise toward the predetermined level $P_1$. This causes the valve element 332 to further axially move toward the valve seat 368 of the internal wall portion 328 of the casing structure 316 and has the annular sealing element 336 located past the closed axial ends of the grooves 350 and 350' in the casing structure 316. The water pumped from the water circulation pump 84 is therefore passed totally into the passageway 360 through a gap formed between the valve seat 368 of the internal wall portion 328 of the casing structure 316 and the assembly of the valve element 332 and the annular pad 338 thereon. As the valve element 332 is axially moved closer to the valve seat face 340, such a gap is reduced gradually and is finally eliminated when the valve element 332 reaches its initial axial position having the annular pad 338 seated on the valve seat 368 of the internal wall portion 328 of the casing structure 316. The passageway 360 being thus closed at its end in the flow detecting and checking means 314a, the pressure of the water in the first variable-volume compartment 324a of the feedback valve means 314b is reduced to the level of the elavation head Ph established in the suction port of the water circulation pump 84. The sum of the force exerted on the diaphragm element 372 of the differential pressure detecting means 314c by the water pressure Pb (which is substantially equal to the elevation head Ph) in the first variable-volume compartment 326a of the means 314c and the force of the compression spring 386 is overcome by the opposing force exerted on the diaphragm element 372 by the water pressure Ps (which is substantially equal to the predetermined level $P_1$) established in the hot-water supply circuit now forming part of the pressure trapping circuit and accordingly in the second variable-volume compartment 326b of the means 314c. The diaphragm element 372 is therefore moved or deformed in the direction to expand the second variable-volume compartment 326b and accordingly the plunger rod 380 connected to the disc member 374 on the diaphragm element 372 is axially moved back in the direction to retract into the casing structure 316 until the disc member 374 is seated on the end face of the internal land 384 projecting into the first variable-volume compartment 326a. While the plunger rod 380 is being axially moved in the direction to retract in the casing structure 316, the plunger rod 380 is disengated from the actuating element (not shown) of the limit switch assembly 388, which is therefore allowed to open and de-energize the motor of the water circulation pump 84. The water circulation pump 84 is thus brought to a full stop and ceases delivery of water under pressure to the control valve unit 314. The control valve unit 314 now functions merely as a one-way check valve maintaining the pressure trapping circuit between the water outlet port 320 of the valve unit 314 and the individual terminal valves 108.

Figure 13:
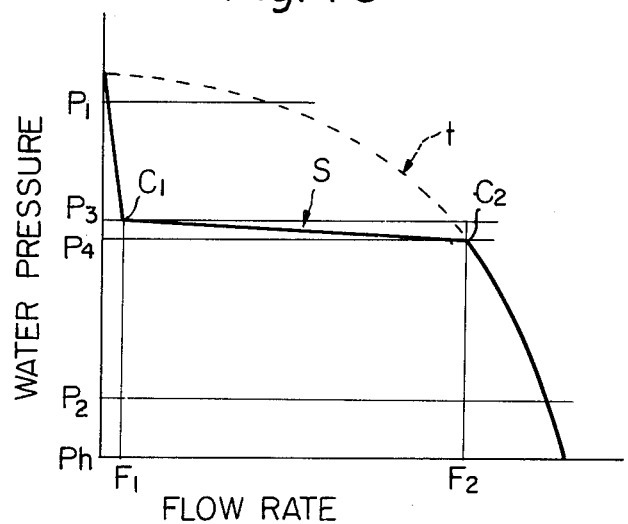
FIG. 13 is a graph similar to FIG. 5 but shows the performance characteristic of the control valve unit illustrated in FIG. 12.

The control valve unit 314 of the fourth embodiment of the central air-conditioning system hereinbefore described with reference to FIGS. 12 and 13 is characterized in that the water circulation pump 84 is started by detecting an increment in the differential pressure between the suction port of the pump 84 and the hot-water supply circuit 90 when one of the terminal valves 108 is opened up and is shut off by detecting from the distance of movement of the valve element 332 a decrement in the flow rate of water through the control valve unit 314 to the hot-water supply circuit 90 as caused when the terminal valve is being closed and by converting such a decrement in the water flow rate into a variation in the differential pressure by increasing the resistance to the flow of water into the feedback circuit as the decrement in the water flow rate increases. The control valve unit 314 shown in FIG. 12 is thus advantageous for reducing fluctuations in the flow rate of the water through each of the terminal heating units in use when the number of the terminal heating units in use is changed during operation, as will be understood from the line segment $C_1-C_2$ of the curve s shown in FIG. 13.

Figure 14:
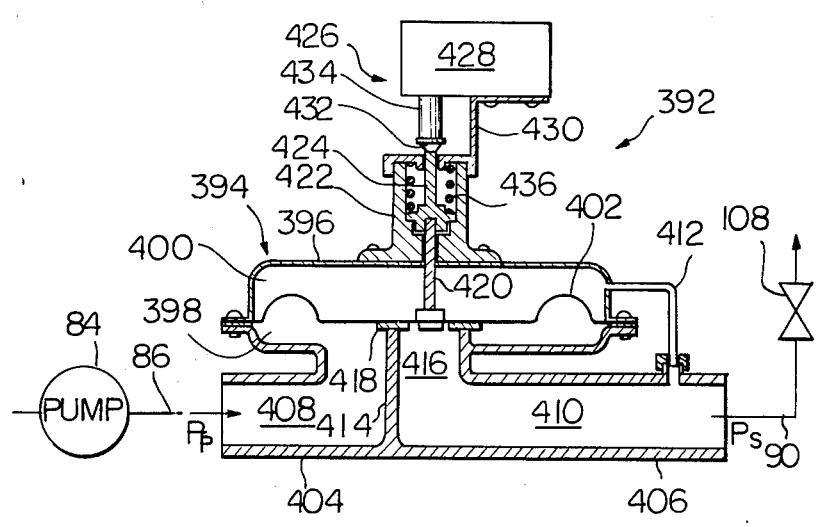
FIG. 14 is a cross sectional view of the control means forming part of a fifth preferred embodiment of the central air-conditioning system according to the present invention.

FIG. 14 illustrates a pump control unit forming part of a fifth preferred embodiment of the central air-conditioning system according to the present invention. The pump control unit herein shown is operative only to shut off the water circulation pump and, thus, co-operates with another pump control unit which is adapted to start the pump. The pump control unit to start the water circulation pump is not herein illustrated but may be arranged in such a manner as to be responsive to the variation in the differential water pressure between the suction port of the pump and the hot-water supply circuit which forms part of the pressure trapping circuit when all the terminal heating units are at rest. Such a pump start control unit may be constructed similarly to the differential pressure detecting means 88b of the control valve unit 44 illustrated in FIG. 3.

Referring to FIG. 14, the pump shut-off control unit, designated in its entirety by reference numeral 392 comprises a diaphragm assembly 394 having a hollow casing structure 396 which is internally divided into complementarily expansible and contractable first and second variable-volume chambers 398 and 400 by a flexible diaphragm element 402 having its outer peripheral end portion secured to the inner wall portion of the casing structure 396. The casing structure 396 has tubular portions 404 and 406 which extend substantially in line with each other and which are formed with water inlet and outlet ports 408 and 410, respectively. The water inlet port 408 is in constant communication with the delivery port of the motor-driven water circulation pump 84 through a hot-water discharge passageway 86 and the water outlet port 410 is in constant communication through the hot-water supply circuit 90 with terminal valves which are diagrammatically represented by a single terminal valve 108. Constant communication is established between the water outlet port 410 and the second variable-volume chamber 400 through a passageway 412. The casing structure 396 of the diaphragm assembly 394 further has a hollow, internal valve seat wall portion 414 which has a bore 416 in constant communication with the water outlet port 410 and which projects into the first variable-volume chamber 398 in a direction substantially perpendicular to the diaphragm element 402, the bore 416 being open to the chamber 398 at its leading end. The diaphragm element 402 has fixedly mounted on its face defining an end of the first variable-volume chamber 398 a valve disc 418 which is axially movable with the diaphragm element 402 into and out of a position seated on the end face of the valve seat wall portion 414 and thus closing the bore 416 in the wall portion 414 at its leading end as shown. A plunger rod 420 is securely connected at one end to the diaphragm element 402 and axially extends throughout the second variable-volume chamber 400 substantially perpendicularly to the diaphragm element 402. The plunger rod 420 axially movably projects out of the casing structure 396 into a hollow guide member 422 fixedly mounted on the casing structure 396 and is securely connected to an elongated piston 424 which is axially movable within the guide member 422. The guide member 422 in turn has mounted thereon pump shut-off switch means 426 which comprises a limit switch assembly 428 mounted on a bracket 430 which is fixedly supported on the guide member 422 as shown. The bracket 430 is formed with an opening 432 aligned with the piston 424 which is therefore axially movable through the opening 432. The limit switch assembly 428 includes an actuating element 434 which axially projects toward the leading end of the piston 424 and which is axially movable toward and away from the piston 424. The piston 424 is constantly in contact at its leading end with the actuating element 434 and is urged by suitable biasing means to axially move in a direction to hold the actuating element 434 in a position to maintain the switch assembly 428 open, such biasing means being shown comprising a preloaded helical compression spring 436 which is accommodated within the hollow guide member 422 and which is seated at one end on the piston 424 and at the other end on the bracket 430. The compression spring 436 is thus effective not only to urge the actuating element 434 of the limit switch assembly 428 to hold its position maintaining the switch assembly open but for urging the diaphragm element 402 to hold its position having the valve disc 418 seated on the leading end of the internal valve seat wall portion 414 of the casing structure 396. The actuating element 434 is arranged to make the limit switch assembly 428 closed when the valve disc 418 is axially moved away from the internal valve seat wall portion 414 of the casing structure 396 over a distance greater than a predetermined value from its axial position seated on the end face of the valve seat wall portion 414. Though not shown, the limit switch assembly 428 is electrically connected between a power source and the motor of the water circulation pump 84 in such a manner that the switch assembly 428 is not operative to provide connection between the power source and the motor when the system is put into operation but is capable of disconnecting the motor from the power source when the system is to be brought to a full stop. A switching circuit to achieve such a function may be constructed similarly to the circuit illustrated in FIG. 9, using the limit switch assembly 428 of FIG. 14 in lieu of the second limit switch assembly 250 in the circuit arrangement of FIG. 9.

When, now, one of the terminal valves 108 which have been held closed is opened up and as a consequence the pressurized water which has been confined in the pressure trapping circuit is drained off into the water return circuit (not shown) of the system, the pressure Ps in the water outlet port 410 of the pump shut-off control unit 392 is rapidly reduced toward the level of the elevation head established in the system, viz., toward the level of the water pressure Pp in the water inlet port 408 of the control unit 392. The water pressure Pp and Ps in the water inlet and outlet ports 408 and 410 are therefore substantially equalized with each other immediately after the terminal valve 108 is opened up. Under these conditions, the forces exerted on the diaphragm element 402 by the water pressures acting on both faces of the element are substantially equal to each other so that the diaphragm element 402 is held in the position having the valve disc 418 seated on the end face of the internal valve seat wall portion 414 of the casing structure 396 by the force of the compression spring 436, thus isolating the water outlet port 408 of the diaphragm assembly 394 from the water inlet port 410 and holding the limit switch assembly 428 open. When the water circulation pump 84 is thereafter initiated into operation to deliver water under pressure to the diaphragm assembly 394, the water pressure Pp in the water inlet port 408 and accordingly in the first variable-volume 398 of the diaphragm assembly 394 is suddenly increased and causes the diaphragm element 402 to axially move or deform in a direction to expand the first variable-volume chamber 398, causing the valve disc 418 to be unseated from the end face of the internal valve seat wall portion 414 of the casing structure 396. The water in the water inlet port 408 is therefore admitted through the first variable-volume chamber 398 into the bore 416 in the valve seat wall portion 414 and through the bore 416 into the water outlet port 410. When the valve disc 416 is thus axially moved away from the end face of the internal valve seat wall portion 414 of the casing structure 396 a distance greater than the previously mentioned predetermined value, then the actuating element 434 of the limit switch assembly 428 is axially moved by the piston 424 into the position to close the limit switch assembly 428. As the flow of the water thus circulated through the hot-water supply circuit 90 is increased gradually or stepwise with another terminal valve opened up, the water pressure Ps in the water outlet port 410 and accordingly in the second variable-volume chamber 400 declines with the result that the diaphragm element 402 is further axially moved away from the end face of the internal valve seat wall portion 414 of the casing structure 396, thereby establishing a continuous flow of water from the first variable-volume chamber 398 to the bore 414 in the wall portion 416. When the terminal valve 108 which has been kept open with the other terminal valves kept closed is initiated into motion to close or the terminal valves 108 which have been kept open are closed in succession, the flow rate of the water through the hot-water supply circuit 90 and accordingly through the water outlet port 410 of the control unit 392 is reduced and as a consequence gives rise to an increase in the water pressure Ps in the second variable-volume chamber 400 of the diaphragm assembly 394. The force exerted on the diaphragm element 402 by the pump pressure Pp in the first variable-volume chamber 398 is therefore overcome by the sum of the force of the compression spring 436 and the force exerted on the diaphragm element 402 by the water pressure Ps in the second variable-volume chamber 400 and allows the diaphragm element 402 to move in a direction to contract the first variable-volume chamber 398. When the sole terminal valve 108 which has been open or the last one of the terminal valves 108 being closed in succession is on the point of being fully closed, the valve disc 418 reaches an axial position spaced apart from the end face of the valve seat wall portion 414 a distance which is smaller than the predetermined value from the valve seat wall portion 414 with the result that the plunger rod 420 and accordingly the elongated piston 424 are axially moved by the force of the compression spring 436 in a direction to allow the actuating element 434 of the limit switch assembly 428 to return to a position to open the switch assembly 428. The motor (not shown) of the water circulation pump 84 is therefore disconnected from the power source and as a consequence the pump 84 is brought to a full stop. The delivery of water under pressure being now terminated, the pressure of the water in the first variable-volume chamber 398 is reduced toward the level of the elevation head established in the system so that the water pressure Ps in the second variable-volume chamber 400 moves, together with the force of the compression spring 436, the diaphragm element 402 into the position having the valve disc 418 seated on the end face of the internal valve seat wall portion 414 of the casing structure 396 against the opposing force exerted on the diaphragm element 402 by the water pressure in the first variable-volume chamber 398, thereby closing the bore 416 in the valve seat wall portion 414 at the leading end of the wall portion 414 as illustrated in FIG. 14. A pressure trapping circuit is thus constituted from the bore 416 in the wall portion 414 to the individual terminal valves 108.

During operation of the central air-conditioning system including the pump shut-off control unit 392 hereinbefore described, the difference, if any, between the respective water pressures Pp and Ps in the first and second variable-volume chambers 398 and 400 and accordingly in the water inlet and outlet ports 408 and 410, respectively, of the diaphragm assembly 394 is regulated by means of the diaphragm element 402 and the preloaded compression spring 436 in such a manner as to be substantially constant. If, therefore, the number of the terminal heating units in operation is changed during operation of the air-conditioning system as will be often the case, the flow rate of the hot water circulated through each of the terminal heating units in use is not seriously affected by such a change.

While, in each of the embodiments hereinbefore described, the water circulation pump forming part of the air conditioning system is shut off in response to a decrease in the flow rate of the hot water through the hot-water supply circuit, arrangement may be made so that the pump is brought to a full stop upon detection of a drop in the temperature of hot water downstream of the boiler. A preferred embodiment of the central air-conditioning system adapted to operate on such a principle is illustrated in FIG. 15.

Figure 15:
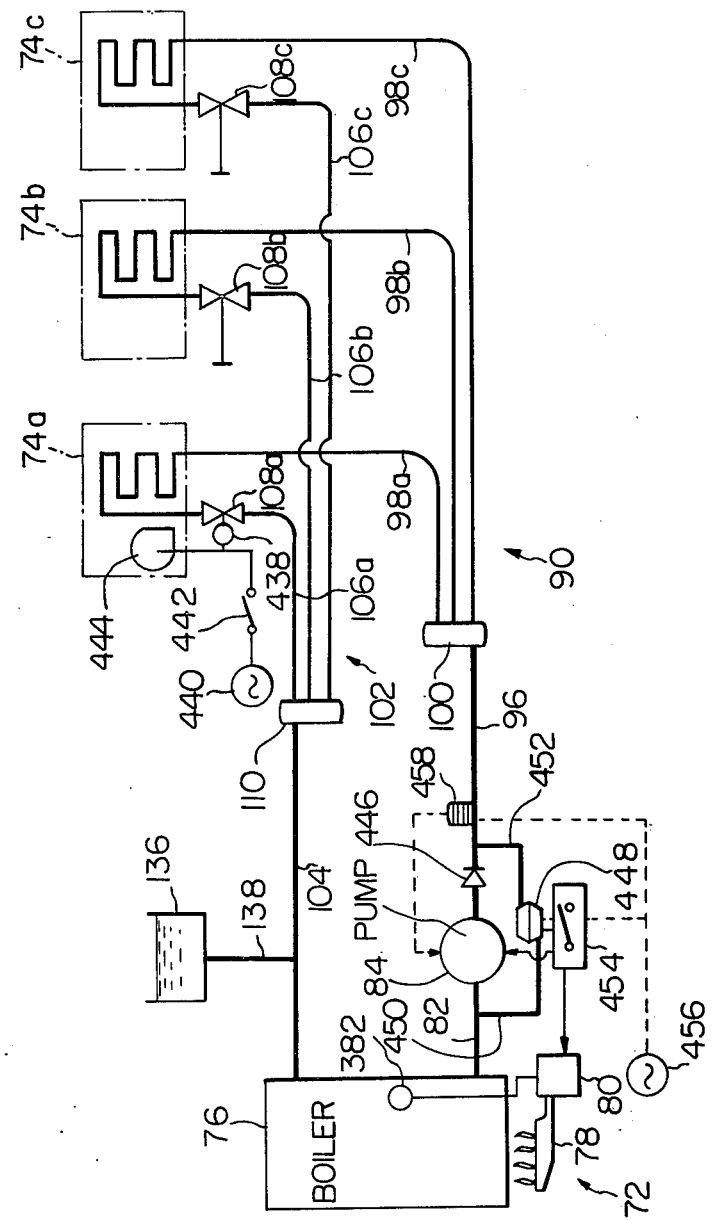
FIG. 15 is a schematic view showing a sixth preferred embodiment of the central air-conditioning system according to the present invention.

Referring to FIG. 15, the air-conditioning system embodying the present invention is shown constructed and arranged largely similarly to the central air-conditioning or heating system illustrated in FIG. 2 and, thus, comprises a water heating unit 72 including a direct-fired hot-water boiler 76 having a fuel burner 78 which is provided with an electrically-operated burner actuator 80. The burner actuator 80 is adapted to start and shut off the fuel burner 78 when electrically energized and de-energized, as previously described with reference to FIG. 2. The boiler 76 has a hot-water outlet communicating with the suction port of a motor-driven water circulation pump 84 through a hot-water delivery passageway 82. The delivery port of the water circulation pump 84 in turn is in communication with a hotwater supply circuit 90 consisting of a main hot-water supply passageway 96 and hot-water supply branch passageways 98a, 98b and 98c branched from the main hot-water supply passageway 96 through a flow distributing manifold or header 100 and terminating in the radiator coils of terminal heating units 74a, 74b and 74c. The terminal heating units 74a, 74b and 74c are communicable with the return-water inlet of the boiler 76 through a water return circuit 102 consisting of a main water return passageway 104 terminating in the return-water inlet of the boiler 76 and water return branch passageways 106a, 106b and 106c leading from the respective radiator coils of the terminal units 74a, 74b and 74c across terminal valves 108a, 108b and 108c, respectively, and jointly terminating in a flow collecting manifold or header 110 from which the main water return passageway 104 leads. The system further comprises an expansion tank 136 which is in communication with the above mentioned main water return passageway 104 through an expansion pipe 138. One of the terminal valves, 108a, as shown, is of the type electrically operated and has a driver or solenoid coil 438 which is electrically connected to an a.c. power source 440 across a manually-operated switch 442. The terminal heating unit 74a associated with such a terminal valve 108a is shown to be provided with a motor-driven blower 444 which is also electrically connected to the a.c. power source 440 across the manually operated switch 442. The remaining terminal valves 108b and 108c are assumed to be of the manually operated type.

The burner actuator 80 and the motor-driven water circulation pump 84 are started and shut off by control means which comprises a one-way check valve 446 provided immediately downstream of the delivery port of the water circulation pump 84 or in the main hot-water supply passageway 96 and adapted to allow water to pass therethrough from the pump 84 to the main hot-water supply passageway 96. A pressure trapping circuit is thus constituted between the check valve 446 and the individual terminal valves 108a, 108b and 108c when the terminal valves are all closed. The above mentioned control means for the burner actuator 80 and the water circulation pump 84 further comprises a diaphragm assembly 448 which is arranged to be responsive to a differential pressure across the pump 84. Though not shown in detail in FIG. 15, the diaphragm assembly 448 has a casing internally divided by a flexible diaphragm element into complementarily expansible and contractable first first and second variable-volume chambers which are respectively in constant communication with the suction port of the water circulation pump 84 through a first passageway 450 and with the outlet port of the one-way check valve 446 through a second passageway 452. The diaphragm assembly 448 thus constructed is mechanically connected to or engageable with differential-pressure responsive electric switching means 454 which is connected between an a.c. power source 456 and each of the burner actuator 80 and the water circulation pump 84. The diaphragm assembly 448 and the switching means 454 are arranged in such a manner as to hold the burner actuator 80 disconnected from the a.c. power source 456 when the water pressure Ps downstream of the one-way check valve 446 is higher a predetermined first value than the water pressure Pb downstream of the water circulation pump 84 and to make the pump 84 electrically connected to the a.c. power source 456 when the water pressure Ps is reduced to a level higher than the water pressure Pb by a second predetermined value smaller than the above mentioned first predetermined value and thereafter make the burner actuator 80 electrically connected to the power source 456 when the water pressure Ps is raised to a level higher than the water pressure Pb by the first predetermined value.

In the main hot-water supply circuit 90 downstream of the one-way check valve 446 is provided a temperature-sensitive switch unit 458 which is mounted on the pipe, conduit or duct (a portion of which is shown at 96a in FIG. 16) forming the main hot-water supply passageway 96 in such a manner as to be sensitive to the temperature of the water to flow through the passageway 96. The temperature-sensitive switch unit 458, which may use a thermostat, is arranged in such a manner as to be open in response to a temperature lower than a predetermined level and to be closed in response to a temperature higher than the predetermined level. The switch unit 458 is electrically connected between the a.c. power source 456 and the water circulation pump 84 so that the above mentioned differential-pressure responsive electric switching means 454 is enabled to start the pump 84 irrespective of the condition of the temperature-sensitive switch unit 458 when the diaphragm assembly 448 detects a differential pressure higher than the aforesaid second predetermined value and that the pump 84 is disconnected from the a.c. power source 456 irrespective of the conditions of the switching means 454 when the temperature-sensitive switch unit 458 detects a temperature higher than the above mentioned predetermined level. The circuit arrangement including the switching means 454 and the temperature-sensitive switch unit 458 may be readily designed by those skilled in the art and is therefore not illustrated in the drawings. By way of example, however, such a circuit may comprise first and second differential-pressure responsive switch elements as part of the switching means 454 in addition to the temperature-sensitive switch unit 458. The first differential pressure responsive switch element is connected between the a.c. power source 456 and the motor of the water circulation pump 84 across a normally-closed contact set and is adapted to close when the diaphragm assembly 448 responds to a differential pressure smaller than the above mentioned predetermined value, while the second differential-pressure responsive switch is connected between the a.c. power source 456 and the solenoid coil or any suitable driver of the burner actuator 80 and is arranged to close when the diaphragm assembly detects a differential pressure smaller than the above mentioned second predetermined value. The series combination of the first differential-pressure responsive switch element and the normally-closed contact set is shunted by a first normally-open contact set which is adapted to be made open when a first coil connected to the a.c. power source across the temperature-sensitive switch unit 458 is energized. A parallel combination of second and third normally-open contact sets is connected across the a.c. power source 456 through a second coil. The second normally-open contact set is adapted to be closed when the above mentioned first coil is energized with the temperature-sensitive switch 458 closed. The third normally-open contact set is adapted to be closed when the second coil is energized with the second normally-open contact set closed. The second coil may be connected to the a.c. power source 456 across a switch which is arranged to be open when the differential pressure acting on the diaphragm assembly 448 is equal to or greater than the above mentioned first predetermined value.

When, now, the central air-conditioning system thus constructed and arranged is held at rest with all of the terminal valves 108a, 108b and 108c kept closed, the water pressure Ps of the water confined in the pressure trapping circuit constituted between the one-way check valve 446 and the individual terminal valves is maintained at a fixed, elevated level so that the diaphragm assembly 448 is in a condition holding the switching means 454 open. Both the burner actuator 80 and the motor-driven water circulation pump 84 are therefore held inoperative so that the temperature-sensitive switch unit 458 is kept open. If one of the terminal valves 108a, 108b and 108c is opened up under these conditions, the pressurized water which has been confined in the pressure trapping circuit is allowed to flow into the water return circuit 102 and causes a rapid drop in the water pressure Ps in the hot-water supply circuit 90 downstream of the one-way check valve 446. The diaphragm assembly 448 is therefore made operative to close and cause the switching means 454 to provide electrc connections between the a.c. power source 456 and the water circulation pump 84 and thereafter between the power source 456 and the burner actuator 80 when the differential pressure between upstream of the pump 84 and downstream of the one-way check valve 446 is reduced to the above mentioned first and second predetermined values, respectively. As a consequence, the water circulation pump 84 and thereafter the burner actuator 80 is started. Under these conditions, the motor of the water circulation pump 84 is connected to the a.c. power source 456 through the first differential pressure responsive switch element and the normally-closed contact set in the above described circuit arrangement.) For a certain period of time after hot water is thus passed through the main hot-water supply passageway 96, the temperature of the water flowing therethrough gradually increases but still remains lower than the predetermined level prescribed for the temperature-sensitive switch unit 458, which is therefore kept open. When the water temperature in the main hot-water supply passageway 96 reaches the predetermined level, then the temperature-sensitive unit 458 closes and provides electric connection between the a.c. power source 456 and the water circulation pump 84 therethrough independently of the switch means 454. (When the temperature-sensitive switch unit 458 is closed in the above described circuit arrangement, the first coil is energized from the a.c. power source 456 so that the first and second normally-open contact sets are caused to close. The second normally-open contact set being closed, the second coil is energized from the a.c. power source 456 so that the third normally-open contact set is closed and at the same time the normally-closed contact set between the power source and the motor of the water circulation pump 84 is opened up. The water circulation pump 84 is now energized from the a.c. power source through the first normally-open contact set.)

Figure 16:
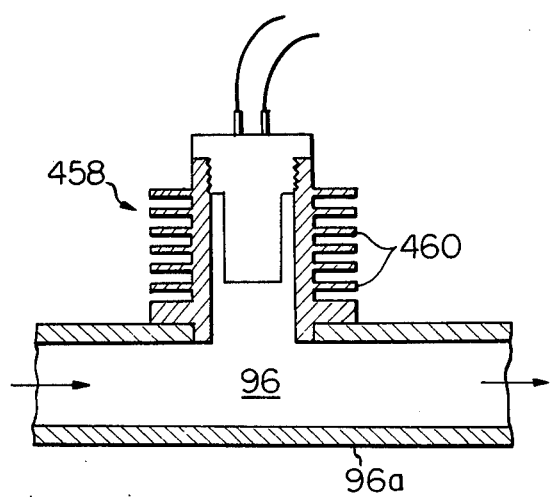
FIG. 16 is a sectional view showing a temperature-sensitive switch unit forming part of the embodiment of FIG. 15.

When the sole terminal valve which has been opened up or the last one of the terminal valves which have been opened and are being closed in succession is closed, the flow rate of the water through the hot-water supply circuit 90 is reduced and as a consequence the water pressure in the circuit 90 increases rapidly. The diaphragm unit 448 is therefore subjected to an increased differential pressure and, when the differential pressure exceeds the previously mentioned second predetermined value, causes the switching means 454 to shut off the burner actuator 80. The water heating unit 72 is now rendered inoperative and ceases heating of the water in the boiler 76. The water circulation pump 84 being still maintained operative, however, water continues to be delivered from the boiler 76 to the hot-water supply circuit by the pump 84. The pipe, conduit or duct 96a forming the main hot-water supply passageway 96 (FIG. 16) is therefore cooled down as cool water is passed through the boiler to the passageway 96 and as the heat in the pipe, conduit or duct 96a is dissipated into the atmosphere or into the material surrounding the same. To enhance the cooling efficiency of the temperature-sensitive switch unit 458 mounted on the pipe, conduit or duct 96a, the switch unit 458 may be formed with radiator fins 460 exposed to the atmosphere as illustrated in FIG. 16.

When the temperature of the water being delivered to the main hot-water supply passageway 96 by the water circulation pump 84 is reduced to the previously mentioned predetermined level, the temperature-sensitive switch unit 458 is opened up and disconnects the motor of the water circulation pump 84 from the a.c. power source 456. (When the temperature-sensitive switch unit 458 is thus opened up in the previously described circuit arrangement, the first coil is de-energized and allows the first and second normally-open contact sets to open. The third normally-open contact set being however held closed with the second coil kept energized from the a.c. power source, the normally-closed contact set is kept open so that the water circulation pump 84 is disconnected from the a.c. power source 450.)

Figure 18:
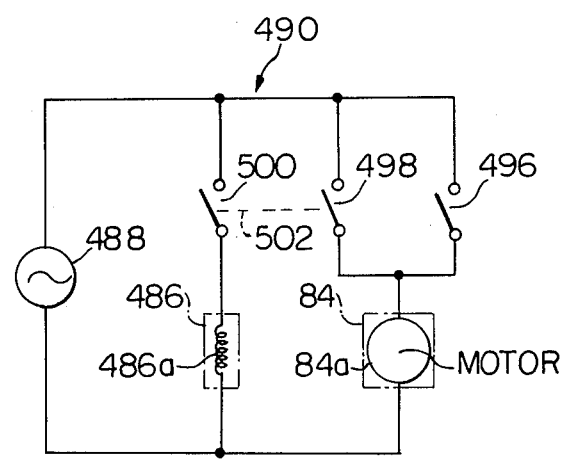
FIG. 18 is a diagram showing an example of an electric switching circuit for use in the embodiment of FIG. 17.

While each of the embodiments hereinbefore described is arranged to be used exclusiverly for space heating or air-conditioning purposes, the basic concept of the present invention can be realized not only in a central air-conditioning system for achieving such a purpose but in a system including at least one terminal water heating or cooling unit in addition to the terminal space heating or cooling units. FIGS. 17 and 18 illustrate an embodiment of such a system including a bath as the terminal water heating unit.

Referring to FIG. 17, the system embodying the present invention is shown largely comprising a space heating arrangement 462 and a terminal water heating arrangement 464. The space heating arrangement 462 per se is shown similar to the terminal heating arrangement illustrated in FIG. 15 and thus comprises a hot-water supply circuit 90 consisting of a main hot-water supply passageway 96 and hot-water supply branch passageways 98a, 98b and 98c branched from the passageway 86 through a flow distributing header 100, a parallel combination of terminal heating units 74a, 74b and 74c in which the hot-water supply branch passageways 98a, 98b and 98c terminate respectively, and a water return circuit 102 consisting of a main return water passageway 104 and return water branch passageways 106a, 106b and 106c leading from the terminal heating units 74a, 74b and 74c across terminal valves 108a, 108b and 108c, respectively. The main water return passageway 104 is in communication with an expansion tank 136 through an expansion pipe 138 and terminates in the return-water inlet of a central water heating unit 72. On the other hand, the terminal water heating arrangement 464 comprises a bath 466 as a terminal water heating unit. The bath 466 has a water heating chamber 468 through which is passed a heating coil 470. The heating coil 470 intervenes between a hot-water supply passageway 472 and a water return passageway 476 across a terminal valve 474 which is assumed, by way of wxample, to be of a solenoid-operated type to be closed and opened up by means of a manually-operated switch unit 478. The switch unit 478 may include a temperature-sensitive switch 480 responsive to the temperature of the water in the bath 466, particularly in the water heating chamber 468 thereof as illustrated.

The system shown in FIG. 17 further comprises first and second control valve units 482 and 484 which have respective water outlet ports in communication with the main hot-water supply passageway 96 in the terminal space heating arrangement 462 and the hot-water supply passageway 472 of the terminal water heating arrangement 464, respectively. The first and second control valve units 482 and 484 have respective water inlet ports communicable through a solenoid-operated three-way flow-shift valve 486 to the delivery port of a motor-driven water circulation pump 84 the suction port of which is in constant communication with the hot-water outlet of the water heating unit 72 through a hot-water delivery passageway 82. The three-way flow-shift valve 486 is arranged to be biased to provide communication from the delivery port of the water circulation pump 84 to the water inlet port of the first control valve unit 482 and to provide communication from the delivery port of the water circulation pump 84 to the water inlet port of the second control valve unit 484 when electrically energized. The motor of the water circulation pump 84 and the solenoid coil of the three-way flow shift valve 486 are electrically connected to an a.c. power source 488 across electric switching means 490. Though not shown, each of the central water heating unit 72 and the terminal water heating unit or bath 466 includes an actuator for starting and heating the fuen burner. Such actuators in the water heating unit 72 and the bath 466 are also electrically connected to the a.c. power source through the switching means 490. Each of the first and second control valve units 482 and 484 may be constructed and arranged similarly to the control valve unit or the pump control means of any of the embodiments hereinbefore described with reference to FIGS. 2 and 16 but is herein assumed to be essentially similar to the control valve unit illustrated in FIG. 3. The first and second control valve units 482 and 484 are thus shown communicating with the suction port of the water circulation pump 84 through passageways 492 and 494, respectively, which are branched from the hot-water delivery passageway 82 leading from the hot-water outlet of the central water heating unit 72. When, therefore, the three-way flow-shift valve 486 is in a condition providing communication between the delivery port of the water circulation pump 84 and the water inlet port of the first control valve unit 482 or the water inlet port of the second control valve unit 484, the first or second control valve unit 482 or 484 behaves similarly to the control valve unit 88 provided in the embodiment of FIGS. 2 to 4, thereby starting and shutting off the water circulation pump 84 and the actuator for the fuel burner of the central water heating unit 72 or both of the burner actuators of the central and terminal water heating units 72 and 466 in a similar manner to the water circulation pump 84 and the burner actuator 80 in the embodiment of FIGS. 2 to 4.

The solenoid-operated three-way flow-shift valve 486 is biased to provide communication between the delivery port of the water circulation pump 84 and the water inlet port of the first control valve unit 482 so that, when the three-way flow-shift valve 486 remains de-energized, such communication is established through the valve 486. If, therefore, one of the terminal valves 108a, 108b and 108c associated with the terminal space heating units 74a, 74b and 74c, respectively, is opened up under these conditions, the motor-driven water circulation pump 84 and thereafter the burner actuator of the central water heating unit 72 are electrically energized from the a.c. power source 488 and are put into operation delivering hot water to the terminal heating unit in use through the first control valve unit 482. When, however, the three-way flow shift valve 486 is being energized from the a.c. power source 488, the valve 486 is held in a condition establishing communication between the delivery port of the water circulation pump 84 and the water inlet port of the second control valve unit 484 so that, if the terminal valve 476 associated with the terminal water heating unit or bath 466 opened up under these conditions, the motor-driven water circulation pump 84 and thereafter the respective burner actuators of the central and terminal water heating units 72 and 466 are electrically energized from the a.c. power source 488 and are put into operation delivering hot water to the heating coil 470 in the water heating chamber 468 of the terminal water heating unit or bath 466 through the second control valve unit 482. The switching means 490 is thus arranged in such a manner as to maintain the solenoid-operated three-way flow shift valve 486 de-energized when the terminal valve 476 associated with the terminal water heating unit or bath 466 is kept closed and to render the flow-shift valve 486 energized from the a.c. power source 488 when the terminal valve 476 for the terminal water heating unit or bath 466 is opened up even under a condition in which one or more of the terminal valves 108a, 108b and 108c associated with the terminal space heating units 74a, 74b and 74c, respectively, are open. FIG. 18 illustrates a preferred example of the circuit arrangement of the switching means 490 thus adapted to energize and de-energize the solenoid-operated three-way flow-shift valve 486 depending upon the conditions of the terminal space and water heating arrangements 462 and 464.

Referring to FIG. 18, the switching means 490 comprise a parallel combination of normally-open, first, second and third switch elements 496, 498 and 500. The first and second switch elements 496 and 498 are mechanically connected to or engageable with the first and second control valve units 482 and 484, respectively, in the terminal space and water heating arrangements or circuits 462 and 464 of FIG. 17 and, thus, each of the switch elements 496 and 498 is responsive to a differential pressure developed between the suction port of the water circulation pump 84 and the water outlet port of each of the control valve units 482 and 484 and is adapted to close when the differential pressure acting thereon is reduced to a predetermined level intrinsic of each control valve unit. The first and second switch elements 496 and 498 are connected in parallel between the a.c. power source 488 and the motor 84a of the water circulation pump 84 so that the motor 84a is rendered operative when at least one of the switch elements 496 and 498 is closed. On the other hand, the third switch element 500 is ganged with the second switch element 498 by means of a suitable mechaincal linkage 502 and is closed and opened up simultaneously with the second switch element 498. The third switch element 500 is connected between the a.c. power source 488 and the solenoid coil 486a of the solenoid-operated three-way flow-shift valve 486 in parallel with the first and second switch elements 496 and 498.

The switching means 490 diagrammatically shown in FIG. 18 further comprises normally-open switch elements which are electrically connected to the burner actuators of the central and terminal water heating units 74 and 466, respectively, and which are mechanically connected to or engageable with the first and second contrl valve units 482 and 484, respectively, though not shown in FIG. 18. Each of such switch elements is adapted to be closed and makes the burner actuator of each of the central and terminal water heating units 72 and 466 when the differential pressure developed across each of the control valve units 482 and 484 is reduced beyond the above mentioned predetermined level.

When, in operation, the terminal valve 476 for the terminal water heating unit or bath 466 is held closed, the second switch element 498 and accordingly the third switch element 500 are kept open. The solenoid coil 486a of the three-way flow-shift valve 486 is thus disconnected from the a.c. power source 488 and is held in the condition providing communication between the delivery port of the water circulation pump 84 and the water inlet port of the first control valve unit 482. If at least one of the terminal valves 108a, 108b and 108c for the terminal space heating units 74a, 74b and 74c, respectively, is made open under these conditions, the differential pressure between the main hot-water supply passageway 96 and the passageway 492 leading from the suction port of the water circulation pump 84 reaches the above mentioned predetermined level intrinsic to the first control valve unit 482 at a certain time interval after the terminal valve has been opened up. The first control valve unit 482 is therefore rendered operative to close the first switch element 486 in the switching means 490 and makes up a closed loop through the motor 84a of the water circulation pump 84 and the a.c. power source 488 through the first switch element 496, thereby causing the motor 84a to be energized from the a.c. power source 488. The flow-shift valve 486 being in the condition providing communication between the delivery port of the water circulation pump 84 and the water inlet port of the first control valve unit 482, the water delivered from the pump 84 thus started to operate is passed through the flow-shift valve 486 to the control valve unit 482 and is admitted to the hot-water supply circuit 90 of the terminal space heating arrangement 462 when the control valve unit 482 is rendered into a condition allowing the water to flow therethrough. The first control valve unit 482 thereafter causes the switch means 490 shown in FIG. 17 to start the burner actuator of the central water heating unit 74 so that hot water is fed through the water circulation pump 84, flow-shift valve 486 and first control valve unit 482 to the hot-water supply circuit 90 in the terminal space heating arrangement 462.

If the terminal valve 476 associated with the terminal water heating unit or bath 466 is opened up under these conditions, the differential pressure between the water inlet port of the second control valve unit 484 and the suction port of the water circulation pump 84 which is in operation is suddenly reduced and reaches the predetermined level intrinsic of the second control valve unit 484 at a certain time interval after the terminal valve 476 has been made open. The second control valve unit 484 is thus rendered operative to close the second switch element 498 in the switching means 490 shown in FIG. 18 so that the third switch element 500 is caused to close and makes up a closed loop through the solenoid coil 486 of the solenoid-operated three-way flow-shift valve 486 and the a.c. power source 488. As a consequence, the current from the a.c. power source 488 flows not only through the motor 84a of the water circulation pump 84 and each of the first and second switch elements 496 and 498 but through the solenoid coil 486a of the three-way flow-shift valve 486, which is therefore shifted into the condition providing communication between the delivery port of the water circulation pump 84 and the water inlet port of the second control valve unit 484. The second control valve unit 484 is therefore acted upon by the pressure of the hot water continuedly delivered from the water circulation pump 84 and is rapidly rendered into the condition to close the switch element so as to make the burner actuator of the terminal water heating unit or bath 466 operative. The communication between the delivery port of the water circulation pump 84 and the water inlet port of the first control valve unit 482 being thus interrupted, the differential pressure between the water inlet and outlet ports of the first control valve unit 482 and the differential pressure between the suction port of the water circulation pump 84 and the water outlet port of the first control valve unit 482 are substantially eliminated and, as a consequence, the first control valve unit 482 is rendered into a condition interrupting the communication across the valve unit 482 but maintaining the first switch element 496 closed. At least one of the terminal valves 108a, 108b and 108c for the terminal space heating units 74a, 74b and 74c, respectively, being kept open, the hot-water supply circuit 90 in the terminal space heating arrangement 462 is held in communication with the return water circuit 102 so that the pressure of the water staying in the hot-water supply circuit 90 is maintained at the level of the elevation head established in the system. The terminal space heating unit having its associated terminal valve kept open thus remains inoperative as a terminal space heater as long as the terminal valve 476 for the terminal water heating unit or bath 466 is kept open. When, however, the terminal valve 476 for the terminal water heating unit 466 is closed by, for example, the temperature-sensitive switch 480 calling for reduction of the temperature in the heating chamber 468 in response to the rise of the water temperature in the chamber 468 to a predetermined level, then the second control valve unit 484 is rendered into the condition to allow the second switch element 498 and accordingly the third switch element 500 to open in the switching means 490 shown in FIG. 18. The solenoid coil 486a of the three-way flow-shift valve 486 is now de-energized and as a consequence the flow-shift valve 486 is allowed to resume its initial condition providing communication between the delivery port of the water circulation pump 84 and the water inlet port of the first control valve unit 482, which is accordingly caused to open at a certain time interval after the pump pressure is developed in the water inlet port thereof.

The second control valve 484 and the switching means 490 operate in the same manner as above described when the terminal valve 476 for the terminal water heating unit 466 is opened up with all of the terminal valves 108a, 108b and 108c in the terminal space heating arrangement 462 kept closed, except in that the first switch element 496 of the switching means 490 is left open so that the motor 84a of the water circulation pump 84 is electrically connected to the a.c. power source 488 through the second switch element 498 alone, as will be readily understood.

While, in the foregoing description, it has been assumed that the terminal water heating arrangement 464 is rendered operative predominantly over the terminal space heating arrangement 462, the system may be modified to enable the latter to operate predominantly over the former. For this purpose, the solenoid-operated three-way flow-shift valve 486 may be arranged in such a manner as to be biased to provide communication with the second control valve unit 484 and to be shifted into a condition providing communication with the first control valve unit 482 when energized.

What is claimed is:

1. A central air-conditioning system comprising a central heat-exchanger unit operative to produce liquid heat-exchange medium therein; a plurality of terminal air-conditioning units each adapted to pass the liquid heat-exchange medium therethrough; forced-flow inducing means having a liquid inlet end in communication with said central heat-exchanger unit and operative to deliver from the liquid outlet end the liquid heat-exchange medium under pressure; circuit means including a liquid supply circuit comprising a main supply passageway communicable with the liquid outlet end of said forced-flow inducing means and branch supply passageways leading from the main passageway and respectively terminating in said terminal air-conditioning units and a return circuit communicable with said terminal air-conditioning units and terminating in said central heat-exchanger unit; terminal valves provided between said central heat-exchanger unit and said terminal air-conditioning units, respectively, and each having open and closed conditions; and control means provided between the liquid outlet end of said forced-flow inducing means and said main supply passageway and responsive to operational conditions of said circuit means having a first condition in which at least one of said terminal valves is open, a second condition in which one of the terminal valves is being closed with the remaining terminal valves fully closed, and a third condition in which all of the terminal valves are fully closed, said control means being operative to render said central-heat exchanger unit and said forced-flow inducing means operative in response to said first condition of the circuit means and inoperative in response to each of said second and third conditions of the circuit means and to disconnect said circuit means from said forced-flow inducing means in response to said third condition of the circuit means for forming a pressure trapping circuit which is closed at one end by said control means and at the other ends by said terminal valves.

2. A central air-conditioning system as set forth in claim 1, in which said control means comprises differential-pressure responsive means responsive to variation in the differential liquid pressure developed across said control means, said control means being operative to render said forced-flow inducing means operative when the differential liquid pressure responded to by said differential-pressure responsive means is lower than a predetermined limit.

3. A central air-conditioning system as set forth in claim 1, in which said control means comprises differential-pressure responsive means responsive to variation in the differential liquid pressure developed across said control means, said control means being operative to render said forced-flow inducing means operative when said differential liquid pressure is lower than a predetermined limit and inoperative when the differential liquid pressure responded to by said differential-pressure responsive means is higher than said predetermined limit.

4. A central air-conditioning system as set forth in claim 1, in which said control means comprises differential-pressure responsive means responsive to variation in the differential liquid pressure developed between locations upstream of said forced-flow inducing means and downstream of said control means, said control means being operative to render said forced-flow inducing means operative when the differential liquid pressure responded to by said differential-pressure responsive means is lower than a predetermined limit and inoperative when the differential pressure is higher than said predetermined limit.

5. A central air-conditioning system as set forth in claim 1, in which said control means comprises differential-pressure responsive means responsive to variation in the differential liquid pressure developed between locations upstream of said forced-flow inducing means and downstream of the control means, and valve means which has a liquid inlet port in communication with the liquid outlet end of said forced-flow inducing means and a liquid outlet port in communication with said liquid supply circuit and which is responsive to variation in the flow rate of the liquid heat-exchange medium from said liquid inlet port to said liquid outlet port of the valve means, said differential-pressure responsive means being operative to render said forced-flow inducing means operative when the differential liquid pressure responded to by said differential-pressure responsive means is lower than a predetermined limit, said control means being operative to render said central heat-exchanger unit operative and maintain said forced-flow inducing means operative when the flow rate of the liquid heat-exchange medium through said valve means is higher a first predetermined level and to render the central heat-exchanger unit and the forced-flow inducing means inoperative respectively when said flow rate is lower than a second predetermined level and said first predetermined level, said first predetermined level being higher than said second predetermined level and being not lower than a level at which said differential liquid pressure is at said predetermined limit.

6. A central air-conditioning system as set forth in claim 1, in which said control means comprises differential-pressure responsive valve means which has a liquid inlet port in communication with the liquid outlet end of said forced-flow inducing means and a liquid outlet port in communication with said liquid supply circuit and which is responsive to variation in the differential liquid pressure between said liquid inlet port and said liquid outlet port of the valve means and to flow rate of the liquid heat-exchange medium from said liquid inlet port to said liquid outlet port, said control means being operative to render said forced-flow inducing means operative when the differential liquid pressure responded to by said valve means is lower than a predetermined limit and inoperative when the flow rate responded to by the valve means is lower than a predetermined level at which said differential liquid pressure is hither than said predetermined limit of the differential liquid pressure.

7. A central air-conditioning system as set forth in claim 1, in which said control means comprises a check valve having a liquid inlet end in communication with the liquid outlet end of said forced-flow inducing means and a liquid outlet end in communication with said liquid supply circuit, and differential-pressure responsive means responsive to variation in the differential liquid pressure developed across said check valve, said differential-pressure responsive means being operative to render said forced-flow inducing means when the differential liquid pressure responded to by said differential-pressure responsive means is lower than a first predetermined level and inoperative when the differential liquid pressure is higher than a second predetermined level which is higher than said first predetermined level.

8. A central air-conditioning system as set forth in claim 1, in which said control means comprises valve means which has a liquid inlet port communicating with the liquid outlet end of said forced-flow inducing means and a liquid outlet port communicating with said liquid supply circuit and which is responsive to variation in the flow-rate of the liquid heat-exchange medium from said liquid inlet port to said liquid outlet port of the valve means, differential-pressure responsive means responsive to variation in the differential liquid pressure developed between locations upstream of said forced-flow inducing means and downstream of said valve means, and feedback means having a liquid inlet port communicable with the liquid outlet end of said forced-flow inducing means and a liquid outlet port in constant communication with the liquid inlet end of the forced-flow inducing means, said valve means being in a condition allowing the liquid inlet port of the feedback means to fully open when the flow rate of the liquid heat-exchange medium through the valve means is higher than a first predetermined level and being in a condition to allow the liquid inlet port of the feedback means to partially open when said flow rate is lower than said first predetermined level and higher than a second predetermined level lower than the first predetermined level, said control means being operative to render said forced-flow inducing means operative when the differential liquid pressure responded to by said differential-pressure responsive means is lower than a first predetermined limit and inoperative when said differential liquid pressure is lower than a second predetermined limit which is not lower than said first predetermined limit.

9. A central air-conditioning system as set forth in claim 1, in which said control means comprises differential pressure responsive valve means which has a liquid inlet port communicating with the liquid outlet end of said forced-flow inducing means and a liquid outlet port communicating with said liquid supply circuit and which is responsive to variation in the differential pressure between said liquid inlet port and said liquid outlet port, said control means being operative to render said forced-flow inducing means operative and establish a substantially fixed pressure in the liquid heat exchange medium downstream of said liquid outlet port when the differential liquid pressure responded to by said valve means is lower than a predetermined limit and being operative to render said forced-flow inducing means inoperative when the differential liquid pressure responded to by said valve means is higher than said predetermined limit.

10. A central air-conditioning system as set forth in claim 1, in which said control means comprises a check valve having a liquid inlet end communicating with the liquid outlet end of said forced-flow inducing means and a liquid outlet end communicating with said liquid supply circuit, differential-pressure responsive means responsive to variation in the differential liquid pressure developed between locations upstream of said forced-flow inducing means and downstream of said check valve, and temperature-sensitive means sensitive to variation in the temperature of the liquid heat-exchange medium in said liquid supply circuit downstream of said check valve, said control means being operative to render said forced-flow inducing means operative when the differential liquid pressure responded to by said differential-pressure responsive means is lower than a predetermined limit and inoperative when the temperature responded to by said temperature sensitive means is lower than a predetermined level.

11. A central air-conditioning system as set forth in claim 5, in which said control means further comprises a casing formed with said liquid inlet and outlet ports and first and second chambers of which the first chamber is in constant communication with said liquid outlet port, said casing being further formed with an opening between said liquid inlet port and said first chamber, wherein said valve means comprises a valve element movable within said first chamber into and out of an axial position closing said opening and thereby isolating said first chamber from said liquid inlet port, said casing being further formed with at least one groove extending substantially in parallel with the direction of movement of said valve element from a point at a predetermined distance from said opening and terminating and opening at another predetermined distance from the opening so that the valve element located on said groove provides a restricted flow rate between said first chamber and said opening through said groove, a valve stem axially extending from said valve element in a direction opposite to said opening and axially slidably projecting out of said casing and biasing means urging said valve element toward said axial position closing said opening, and wherein said differential-pressure responsive means comprises a flexible diaphragm element fastened to said casing and dividing said second chamber into complementarily expansible and contractable first and second variable-volume compartments, the first variable-volume compartments, the first variable-volume compartment being in constant communication with the liquid inlet end of said forced-flow inducing means and the second variable-volume compartment being in constant communication with said liquid supply circuit, a plunger rod axially extending from said diaphragm element throughout said first variable-volume compartment generally perpendicularly to the direction in which the diaphragm element is deformable within said second chamber, the plunger rod being axially movably projecting out of said casing, and biasing means urging said diaphragm element to deform in a direction to contract said second variable-volume compartment, said control means further comprising electric switching means including a first limit switch which is electrically connected between a power source and said forced-flow inducing means for energizing and rendering operative the forced-flow inducing means when the first limit switch is closed and which has an actuating element with which said valve stem of said valve means is engageable at its outwardly projecting end portion and which is adapted to cause the first limit switch to close when the valve stem is brought into pressing engagement with the actuating element and a second limit switch which is electrically connected between said power source and said central heat-exchanger unit for energizing and rendering operative the central heat-exchanger unit when the second limit switch is closed and which has an actuating element with which each of said valve stem of said valve means and said plunger rod of said differential-pressure responsive means is engageable and which is adapted to cause the second limit switch to close when pressed upon by at least one of said valve stem and said plunger rod, said valve stem of said valve means being brought into pressing engagement with the respective actuating elements of the second and first limit switches when the valve stem is axially moved first and second predetermined distances, respectively, from a position having said valve element in said axial position closing said opening, and said plunger rod of said differential-pressure responsive means being brought into pressing engagement with the actuating element of said second limit switch when the plunger rod is axially moved a third distance from an axial position having said diaphragm element in a position contracting said second variable-volume compartment to a minimum space, said first predetermined distance being less than said second predetermined distance and said third predetermined distance being such that the actuating element of the second limit switch is in engagement with said plunger rod when said valve stem is displaced over said first predetermined distance from said axial position thereof.

12. A central air-conditioning system as set forth in claim 11, in which said valve stem is connected to said valve element in such a manner as to have a predetermined amount of allowance enabling the valve stem to laterally movable relative to the valve element.

13. A central air-conditioning system as set forth in claim 12, in which said control means further comprises an electric switching circuit wherein said central heat-exchanger unit and said forced-flow inducing means are electrically connected in parallel to said power source across said first and second limit switches, respectively, said switching circuit comprising delay means electrically connected between said power source and said forced-flow inducing means.

14. A central air-conditioning system as set forth in claim 13, in which said delay means comprises a relay consisting of a coil connected to said power source across said second limit switch and a normally-open contact set which is connected between said power source and said forced-flow inducing means in parallel with said second limit switch and which is adapted to be closed when said coil is energized from said power source.

15. A central air-conditioning system as set forth in claim 6, in which said control means further comprises a casing formed with said liquid inlet and outlet ports and a chamber which is in constant communication with said liquid outlet port, said casing being further formed with an opening between said liquid inlet port and said chamber, wherein said differential-pressure responsive valve means comprises a valve element movable within said chamber into and out of an axial position closing said opening and thereby isolating said chamber from said liquid inlet port, said casing being further formed with at least one groove extending substantially in parallel with the direction of movement of said valve element from a point at a predetermined distance from said opening and terminating and opening at another predetermined distance from the opening so that the valve element located on said groove provides a restricted flow rate between said chamber and said opening through said groove, a valve stem axially extending from said valve element in a direction opposite to said opening and axially slidably projecting out of said casing, and biasing means urging said valve element to stay in a predetermined intermediate axial position within said chamber when the pressures of the liquid heat-exchange medium in said opening and said liquid outlet ports are substantially equal to each other, said control means further comprising switching means including first and second limit switches having respective actuating elements each having an initial position holding each of the switches open, the first limit switch being adapted to close when the actuating element thereof is pressed and moved in one direction a distance more than a first predetermined distance from its initial position and to open when the actuating element thereof is moved back beyond a position displaced from its initial position a second predetermined distance from the initial position thereof, the first predetermined distance being less than the second predetermined distance, the second limit switch being adapted to close when the actuating element thereof is pressed and moved in one direction a distance more than a third predetermined distance from its initial position and to open when the actuating element is moved back beyond a position displaced from its initial position a fourth predetermined distance from the initial position thereof, the third predetermined distance being more than said fourth predetermined distance, said valve stem being movable away from said axial position thereof over first, second, third and fourth predetermined distances from said axial position thereof and held in pressing engagement with said actuating elements of the first and second limit switches when the valve stem is located at said first, second, third and fourth predetermined distances from said axial position thereof, the first, second, fourth and third predetermined distances of the valve stem being larger in this sequence, said first and second limit switches being electrically connected between a power source and said forced-flow inducing means so that the forced-flow inducing means is energized from said power source and is rendered operative when said first limit switch is closed and inoperative when said second limit switch is open.

16. A central air-conditioning system as set forth in claim 15, in which said switching means further comprises a first relay consisting of a coil and normally-open first and second contact sets and a second relay consisting of a coil, a first contact set consisting of first and second stationary contacts and a movable contact biased to be connected to the first stationary contact and a normally-open second contact set, said coil of the first relay being connected in series with said power source across said first and second limit switches, said coil of the second relay being connected to said power source across a parallel combination of the respective second contact sets of said first and second relays and across said first limit switch, said forced-flow inducing means being electrically connected to said power source across said first limit switch and through said first stationary contact when said movable contact is connected to the first stationary contact and being electrically connected to said power source across said first limit switch and said first contact set of said first relay and through said second stationary contact when said movable contact is connected to the second stationary contact, said normally-open first and second contact sets of said first relay being closed when said coil of the first relay is energized, said movable contact being connected to said second stationary contact and said normally-open second contact of said second relay being closed when said coil of the second relay is energized.

17. A central air-conditioning system as set forth in claim 7, in which said differential-pressure responsive means comprises a diaphragm assembly having a hollow casing, a flexible diaphragm dividing the internal space in the casing into complementarily expansible and contractable first and second variable-volume chambers, the first variable-volume chamber being in constant communication with the liquid inlet end of said check valve and the second variable-volume chamber being in constant communication with the liquid outlet end of said check valve, biasing means urging said diaphragm element in a predetermined intermediate position within said casing, and a plunger rod extending from said diaphragm element throughout said second variable-volume chamber generally perpendicularly to the direction in which said diaphragm element is deformable within said casing, said plunger rod axially movably projecting out of said casing, said control means further comprising switching means with which said plunger rod is engageable at its outwardly projecting end portion.

18. A central air-conditioning system as set forth in claim 17, in which said switching means comprises first and second limit switches having respective actuating elements each having an initial position holding each of the switches open, the first limit switch being adapted to close when the actuating element thereof is pressed and moved in one direction a distance more than a first predetermined distance from its initial position and to open when the actuating element thereof is moved back beyond a position displaced from its initial position a second predetermined distance from the initial position thereof, the first predetermined distance being less than the second predetermined distance, the second limit switch being adapted to close when the actuating element thereof is pressed and moved in one direction a distance more than a third predetermined distance from its initial position and to open when the actuating element is moved back beyond a position displaced from its initial position a fourth predetermined distance from the initial position thereof, the third predetermined distance being more than said fourth predetermined distance, said plunger rod being movable away from said axial position thereof over first, second, third and fourth predetermined distances from said axial position thereof and held in pressing engagement with said actuating elements of the first and second limit switches when located at said first, second, third and fourth predetermined distances from said axial position thereof, the first, second, fourth and third predetermined distances of the plunger rod being larger in this sequence, said first and second limit switches being electrically connected between a power source and said forced-flow incuding means so that the forced-flow inducing means is energized from said power source and is rendered operative when said first limit switch is closed and inoperative when said second limit switch is open.

19. A central air-conditioning system as set forth in claim 8, in which said control means further comprises a casing formed with said liquid inlet and outlet ports and first, second and third chambers of which the first chamber is in constant communication with said liquid outlet port, said casing being further formed with an opening between said liquid inlet port and said first chamber, wherein said valve means comprises a valve element movable within said first chamber into and out of an axial position closing said opening and thereby isolating said first chamber from said liquid inlet port, said casing being further formed with at least one groove extending substantially in parallel with the direction of movement of said valve element from a point at a predetermined distance from said opening and terminating and opening at another predetermined distance from the opening so that the valve element located on said groove provides a restricted flow rate between said first chamber and said opening through said groove, a valve stem axially extending from said valve element in a direction opposite to said opening and axially slidably projecting out of said casing, and biasing means urging said valve element toward said axial position closing said opening, said feedback means comprising first and second diaphragm elements which are fastened to said casing and which are securely connected together at a predetermined spacing therebetween for forming first and second variable-volume compartments in said second chamber, the first variable compartment being defined at one end by face of said first diaphragm element and being in constant communication with said liquid outlet port of the feedback means and communicable with a feedback passageway having one end in said liquid inlet port of the feedback means and the other end located within said first variable-volume compartment, said second variable-volume compartment being defined between said first and second diaphragm elements and being in constant communication with said liquid supply circuit, the first diaphragm element being smaller in pressure acting area than said second diaphragm element, a valve feedback control valve element securely mounted on said one face of said first diaphragm element and movable with the first diaphragm element into and out of an axial position closing said other end of said feedback passageway, and biasing means urging said first and second diaphragm elements to move within said second chamber in a direction to have said feedback control valve element in said axial position thereof, said liquid inlet port of the feedback means being located to intervene between said opening and said groove, said differential-pressure responsive means comprising a flexible diaphragm element fastened to said casing and dividing said third chamber into complementarily expansible and contractable first and second variable-volume compartments, the first variable-volume compartment of the differential-pressure responsive means being in constant communication with the liquid inlet end of said forced-flow inducing means and the second variable-volume compartment of the differential-pressure responsive means being in constant communication with said liquid supply circuit, a plunger rod axially extending from said diaphragm element throughout said first variable-volume compartment of the differential-pressure responsive means generally perpendicularly to the direction in which the diaphragm element is deformable within said third chamber, the plunger rod being axially movably projecting out of said casing, and biasing means urging said diaphragm element of the differential-pressure responsive means to deform in a direction to contract said second variable-volume compartment of the differential-pressure responsive means, said control means further comprising electric switching means with which said plunger rod is engageable.

20. A central air-conditioning system as set forth in claim 9, in which said differential-pressure responsive means comprises a hollow casing, a flexible diaphragm element fastened to the casing and dividing the internal space in the casing into complementarily expansible and contractable first and second variable-volume chambers which are in constant communication with said liquid inlet and outlet ports, respectively, a valve seat wall forming part of said casing and projecting into said first variable-volume chamber, the valve seat wall being formed with an internal space in constant communication with said liquid outlet port and communicable with said first variable-volume chamber, a valve member mounted on said diaphragm element and movable with the diaphragm element into and out of an axial position seated on said valve seat wall and isolating the first variable-volume chamber from said internal space in said valve seat wall, a valve stem extending from said diaphragm element throuout said second variable-volume chamber generally perpendicularly to the direction in which said diaphragm element is deformable within said casing, said valve stem axially movably projecting out of said casing, and biasing means urging said diaphragm element to deform in a direction to contract said first variable-volume chamber and to have said valve member seated on said valve seat wall, said control means further comprising electric switching means with which said valve stem is engageable.

21. A central air-conditioning system as set forth in claim 10, in which said temperature sensitive means includes heat radiator fins exposed to the atmosphere and mounted on a tubular wall portion forming part of said main supply passageway.

22. A central air-conditioning system as set forth in claim 1, further comprising at least one terminal heat-exchanger unit, said circuit means comprising a first liquid supply circuit as the first named liquid supply circuit and a second liquid circuit which is passed through said terminal heat-exchanger unit across a terminal valve, said control means comprising a parallel combination of first and second valve means respectively provided in said first and second liquid supply circuits, the first valve means being adapted to open when at least one of said terminal valves for said terminal air-conditioning units is open and to close when all of said terminal valves are closed and the second valve means being adapted to open when said terminal valve for said terminal heat-exchanger unit is open, a three-way flow-shift valve provided between the liquid outlet end of said forced-flow inducing means and the parallel combination of said first and second valve means and having a first condition providing communication between said forced-flow inducing means and said first valve means and a second condition providing communication between said forced-flow inducing means and said second valve means.

23. A central air-conditioning system as set forth in claim 22, in which said flow-shift valve comprises means biasing the valve to stay in said first condition and in which said control means further comprises an electric switching circuit comprising first and second switches which are mechanically engageable with said first and second valve means, respectively, each of the first and second switches being responsive to a differential pressure across said forced-flow inducing means and each of the first and second valve means, respectively, and being adapted to close when the differential pressure acting on the switch is lower than a prdetermined level, and a third switch which is ganged with said second switch for being open and closed when the second switch is open and closed, respectively, and a coil adapted to cause said flow-shift valve to be brought into said second condition when the coil is energized, said first and second switches being electrically connected in parallel between a power source and said forced-flow inducing means and said third switch being connected between said power source and said coil in parallel with said first and second switches.

* * * * *